US007451181B2

(12) United States Patent
Sasaki et al.

(10) Patent No.: US 7,451,181 B2
(45) Date of Patent: Nov. 11, 2008

(54) APPARATUS FOR CONTROLLING A SHARED SCREEN

(75) Inventors: Kazuo Sasaki, Kanagawa (JP); Ryuichi Matsukura, Kanagawa (JP); Satoru Watanabe, Kanagawa (JP); Tohru Okahara, Osaka (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 10/413,156

(22) Filed: Apr. 15, 2003

(65) Prior Publication Data

US 2004/0024819 A1 Feb. 5, 2004

Related U.S. Application Data

(63) Continuation of application No. 09/358,547, filed on Jul. 22, 1999, now abandoned.

(30) Foreign Application Priority Data

Sep. 24, 1998 (JP) .................................. 10-269187

(51) Int. Cl.
*G06F 15/16* (2006.01)
*G06F 3/00* (2006.01)
(52) U.S. Cl. ....................... 709/204; 709/205; 715/738; 715/751; 715/753
(58) Field of Classification Search ......... 709/204–205, 709/201–203; 715/751, 759, 794–797, 738, 715/753
See application file for complete search history.

(56) References Cited

U.S. PATENT DOCUMENTS 4,555,775 A * 11/1985 Pike ............................. 715/790

(Continued)

FOREIGN PATENT DOCUMENTS

JP 62-53084 3/1987

(Continued)

OTHER PUBLICATIONS

Ohmori T et al. "Cooperative Control for Sharing Applications Based on Distributed Multiparty Desktop Conferencing System: Mermaid" Proceedings of the International Conference on Communications, US New York, IEEE, vol. -, Jun. 14, 1992, pp. 1069-1075.*

(Continued)

*Primary Examiner*—Glenton B. Burgess
*Assistant Examiner*—Lashanya R Nash
(74) *Attorney, Agent, or Firm*—Staas & Halsey LLP

(57) ABSTRACT

An apparatus for controlling a shared screen for shared applications, which can be shared, in a network system of a plurality of connected communication terminals, with other communication terminals when running on the terminals. The communication terminals include a window information acquiring portion for acquiring window information of the application to be shared while running on the terminals. Window controlling portion controls how windows are displayed on the communication terminals. The window controlling portion displays a window of shared space for displaying windows of shared applications collectively on the communication terminals. The windows of the shared applications are displayed as sub-windows in the window of shared space. For the "entire screen sharing type", the apparatus includes a conference managing device having a conference information managing portion for managing information about communication terminals participating in those conferences, and shared screen controlling portion. An unused terminal for providing a shared screen is dynamically selected and provided. With the "application sharing method", it can be recognized easily, whether a displayed application window is shared or unshared, and with the "entire screen sharing method", a terminal for providing a shared screen can be selected optimally, so that the system resource can be used efficiently.

10 Claims, 22 Drawing Sheets

U.S. PATENT DOCUMENTS

| | | | |
|---|---|---|---|
| 5,689,641 A | 11/1997 | Ludwig | |
| 5,727,155 A * | 3/1998 | Dawson | 709/205 |
| 5,745,711 A | 4/1998 | Kitahara et al. | |
| 5,758,110 A * | 5/1998 | Boss et al. | 715/751 |
| 5,760,769 A | 6/1998 | Petrie | |
| 5,796,396 A * | 8/1998 | Rich | 715/741 |
| 5,844,553 A * | 12/1998 | Hao et al. | 715/733 |
| 5,887,136 A * | 3/1999 | Yasuda et al. | 709/204 |
| 5,996,002 A * | 11/1999 | Katsurabayashi et al. | 709/204 |
| 6,061,717 A * | 5/2000 | Carleton et al. | 709/205 |
| 6,185,602 B1 | 2/2001 | Bayrakeri | |
| 6,199,101 B1 | 3/2001 | Pfaff | |
| 6,204,847 B1 | 3/2001 | Wright | |
| 6,219,044 B1 * | 4/2001 | Ansberry et al. | 715/753 |
| 6,271,839 B1 | 8/2001 | Mairs et al. | |
| 6,308,199 B1 * | 10/2001 | Katsurabayashi | 709/204 |
| 6,329,984 B1 | 12/2001 | Boss et al. | |
| 6,570,590 B1 * | 5/2003 | Dubrow et al. | 715/751 |
| 6,584,493 B1 * | 6/2003 | Butler | 709/204 |
| 6,859,928 B2 * | 2/2005 | Wright | 718/102 |
| 2003/0105820 A1 * | 6/2003 | Haims et al. | 709/205 |

FOREIGN PATENT DOCUMENTS

| | | |
|---|---|---|
| JP | 4-116689 | 4/1992 |
| JP | 5-336288 | 12/1993 |
| JP | 7-271690 | 10/1995 |
| JP | 9-81489 | 3/1997 |
| JP | 9-200350 | 7/1997 |
| JP | 10-207722 | 8/1998 |

OTHER PUBLICATIONS

Japanese Office Action issued in Japanese Application No. 10-269187, dated May 25, 2006.

* cited by examiner

| Identifier of shared application window | Displaying position | Address of executing terminal | Display order of window | Bitmap information for window |
|---|---|---|---|---|
| 1 | (20, 30) | 10.211.21.3 | 2 | Bitmap data 1 |
| 2 | (50, 40) | 10.211.21.4 | 1 | Bitmap data 2 |
| 3 | (100, 50) | 10.211.21.3 | 3 | Bitmap data 3 |

*Fig.4*

APPARATUS FOR CONTROLLING A SHARED SCREEN

This application is a Continuation of application number 09/358,547, filed Jul. 22, 1999, now abandoned.

BACKGROUND OF THE INVENTION

1. Field of the Invention

The present invention relates to an apparatus for controlling a shared screen, wherein a plurality of conference participants share an application (sometimes abbreviated as "AP" in the following), which is executable from each communication terminal, to perform a conference via communication terminals connected to a network.

2. Description of the Prior Art

With the proceeding development of computer network systems in recent years, the progress of multimedia technology has promoted the dissemination of electronic conferences utilizing computer networks, so-called electronic conference systems and remote conference systems. Broadly classifying conventional configurations of electronic conference systems, there are the so-called "entire screen sharing" systems and "application sharing" systems.

In electronic conference systems based on entire screen sharing, one of the communication terminals connected to the network is selected as the terminal for providing the shared screen, and the display information for the entire display screen (window) of this communication terminal are sent to the other communication terminals over the network. Based on this display information for the shared screen, the other communication terminals display the shared screen on a portion of a display area of their own display devices. One such conventional conference system of the entire screen sharing type is for example the terminal apparatus for remote conferences in Publication of Unexamined Japanese Patent Application No. Sho 62-53084A.

In the other electronic conference system, the one of the application sharing type, there is no limitation to one specialized terminal as the server for the shared screen, communication terminals participating in the conference can provide applications running on their terminals as shared applications to other terminals over the network, windows of the shared applications are formed on a display screen of the communication terminals by starting the sharing of an application, and a plurality of windows of shared applications are displayed terminal display. Known electronic conference systems of this application sharing type include Microsoft's "Net Meeting™" and Intel's "ProShare™".

However, the above-described electronic conference systems of the entire screen sharing type and the application sharing type pose the following problems.

First of all, in electronic conferences of the entire screen sharing type, a server communication terminals serving the shared screen provides its entire display screen as a shared screen to other client communication terminals, so that the server communication terminal cannot have its own local windows. Therefore, conference participants who use the communication terminal working as the shared screen server cannot open and use private applications. For all conference participants to use the shared screen and local windows for private applications, it is necessary to provide one extra communication terminal as a shared screen server terminal in addition to the communication terminals used by each conference participant.

In the electronic conference system of the entire screen sharing type, it is necessary to settle on a terminal as a shared screen server, or to decide on a communication terminal as a shared screen server from among the participant communication terminals before the electronic conference is held. If a terminal to provide a shared screen is settled on, the participant communication terminals have to connect to this terminal for providing a shared screen, the configuration of the network system is fixed and lacks flexibility, the resources distributed across the network cannot be utilized optimally, and the network costs tend to rise. If the communication terminal serving as the terminal providing the shared screen among the conference participants is decided on before holding the electronic conference, the resources on the network can be utilized efficiently, but negotiation and confirmation procedures among the conference participants are necessary before the conference, which is inconvenient, and does not always lead to an optimal distribution of network resources, when seen from the entire network.

Next, electronic conference systems of the application sharing type pose the problem of inconvenience. In electronic conference systems of the application sharing type, communication terminals participating in an electronic conference are on par to each other, provide private applications that can be performed on their terminal as shared applications open to other terminals, the windows for these shared applications can be displayed on display devices of these communication terminals, and all conference participants can have shared application windows and local windows. However, in an environment of multiple windows, where a plurality of windows are displayed on a display device, there is the problem that it is difficult to recognize whether an application displayed in a window is a shared application or not. Moreover, it is necessary to determine separately for each shared application, whether the participant providing the shared application accepts operation authority for that application to other participants or not, and as the number of shared application increases, their operation becomes complicated and burdensome.

SUMMARY OF THE INVENTION

With regard to the above-described problems, it is an object of the present invention to provide an apparatus for controlling a shared screen, wherein, if constituting an electronic conference system of the so-called application sharing type, wherein shared application windows are provided among the participant communication terminals, it can be recognized easily whether the windows on the display device are windows of shared applications or windows of unshared applications, and it can be easily recognized who has the authority to operate the shared applications.

Furthermore, it is an object of the present invention to provide an apparatus for controlling a shared screen, wherein, if constituting an electronic conference system of the so-called entire screen sharing type, wherein one communication terminal is a terminal for providing a shared screen that provides an entire screen, the configuration of the network is flexible, and a terminal for providing a shared screen can be selected automatically and optimally, and network resources can be used efficiently.

To solve the above problems, a first apparatus for controlling a shared screen for shared applications, which can be shared, in a network system of a plurality of connected communication terminals, with other communication terminals when running on the terminals, the communication terminals comprising a window information acquiring portion for acquiring window information of the application to be shared while running on the terminals, and a window controlling portion for controlling how windows are displayed on the communication terminals, wherein the window controlling portion displays a window of shared space for displaying windows of shared applications collectively on the communication terminals, and the windows of the shared applications are displayed as sub-windows in the window of the shared space.

With this configuration, it can be recognized easily whether the windows on the display devices of the communication terminals participating in the electronic conference are windows of shared applications or windows of unshared applications.

It is preferable that, if the window controlling portion has changed how the window of shared space is displayed in accordance with an operation on one of the communication terminals, the way how the window of shared space is displayed on other communication terminals subsequently changes.

With this configuration, the consistency among the participant terminals of the content of the window of shared space, which serves as the shared screen, can be ensured.

It is preferable that the apparatus for controlling a shared screen comprises means for starting sharing, with which the communication terminals put an application into sharing, and, if sharing of one application displayed on the local window has been started by the means for starting sharing, the window controlling portion removes a window of the one application from the local window, and displays it on the window of shared space.

With this configuration, the sharing of an application that is running on a participant communication terminal can be started, and the windows of this application can be moved from local windows into the window of shared space.

It is preferable that the communication terminals comprise means for starting a shared application, the means for starting a shared application comprising application selection means for selecting an application that can be executed by the communication terminals, and means for starting the selected application on the same terminal, and sharing of the selected application is started, and information necessary for sharing of the application is provided to other communication terminals.

With this configuration, it is possible to start the sharing of application that can be executed on participant communication terminals, and the corresponding application windows can be displayed inside the window of shared space.

It is preferable that an input portion of the means for starting a shared application is included within the window of shared space.

With this configuration, operations relating to the sharing of applications can be executed centrally within the window of shared space.

It is preferable that the apparatus for controlling a shared screen comprises an operation authority managing portion for managing an operation authority, which is the authority for operating a shared application running in the window of shared space and its sub-window, and an operation authority acquiring portion for acquiring the operation authority, wherein only a communication terminal that has acquired the operation authority can operate all shared applications within the window of shared space.

It is also preferable that only a communication terminal that has acquired the operation authority can operate all shared applications within all shared applications.

With this configuration, the assignment of operation authorities, which are the operation authorities with regard to the window of shared space and shared applications can be centralized, and confusion regarding the operation of shared application within the window of shared space can be avoided.

Furthermore, to solve the above problems, a second apparatus for controlling a shared screen of the "entire screen sharing type", wherein, in a network system of a plurality of connected communication terminals, one communication terminal provides a shared screen, and other communication terminals display an entire shared screen provided by the communication terminal as one window, comprises a conference managing device comprising a conference information managing portion for managing information about conferences held on the network and communication terminals participating in those conferences; and a shared screen controlling portion for providing a shared screen; wherein if a conference is held, the conference managing device selects a communication terminal participating in the conference from the communication terminals on the network based on information of the conference information managing portion, and the screen managed by the conference managing device is provided by the conference managing device to the participating communication terminals as a shared screen.

With this configuration, in an electronic conference of the "entire screen sharing type", the conference managing terminal can determine a communication terminal to be provided with a shared screen optimally and dynamically, and the system resources on the network can be utilized efficiently.

It is preferable that the conference information managing portion of the conference managing device manages information about communication terminals that are candidate terminals for providing a shared screen and can provide a screen as a shared screen to communication terminals participating in a certain conference, when a certain conference is being held, the shared screen controlling portion selects one communication terminal as a terminal for providing a shared screen, based on information about candidate terminals for providing a shared screen managed by the conference information managing portion, and the screen of the selected communication terminal is provided to the participating communication terminals as a shared screen.

With this configuration, unused communication terminals, that are candidate terminals for providing a shared screen, can be selected as terminals for providing a shared screen, and unused system resources can be utilized efficiently.

It is preferable that the conference managing device comprises at least one screen to be provided as a shared screen, and when a certain conference is being held, the shared screen controlling portion selects one of the screens to be provided as a shared screen and provides it to communication terminals participating in the conference.

With this configuration, a screen for providing a shared screen stored and managed by the conference managing terminal itself can be provided to the participant communication terminals.

It is preferable that the participating communication terminals comprise a connection request portion, the conference managing device comprises a connection request receiving portion, and if the participating communication terminals participate join a conference while it is being held, a connection request is sent from the connection request portion to the connection request receiving portion of the conference managing terminal at the time of joining the conference, thereby establishing a connection, and a shared screen provided by the shared screen controlling portion is acquired and displayed as a shared screen.

With this configuration, a new participant communication terminal can join the conference at any time during the conference.

It is preferable that the conference managing device comprises a means for dynamically accepting participation with regard to a participation request from a communication terminal that is not stored in the conference information managing portion as a communication terminal participating in the conference, and temporarily storing in the conference information managing portion communication terminals whose participation has been dynamically accepted as participants in the conference.

With this configuration, communication terminals that do not participate in the conference can be designated as terminals for providing a shared screen, and unused system resources on the network can be utilized efficiently.

It is preferable that the shared screen controlling portion ceases to provide the shared screen when the conference is terminated.

With this configuration, the provision of a shared screen terminates automatically, and the shared screen is released timely, so that it can be used for other electronic conferences.

It is preferable that the communication terminals comprise shared application managing means for storing and managing information of applications running on a shared screen, and when the conference terminates, any shared applications that are still running on the shared screen are automatically closed.

With this configuration, applications that are still running are closed automatically, and removed from sharing.

It is preferable that, if there is no unused shared screen that the shared screen controlling portion can provide in response to a request to hold a conference, the communication terminals participating in the conference for the request to hold a conference are notified that all shared screens that can be provided are currently in use.

With this configuration, participants requesting a conference can be notified of the fact that all shared screens are currently in use, as a routine processing for the case that requests to hold an electronic conference are concentrated, so that a smooth system operation can be warranted.

It is preferable that the apparatus for controlling a shared screen further comprises a conference-requesting-terminal memory portion storing the terminals that sent out the request to hold a conference in the case of the notification, wherein after the notification, if the shared screen controlling portion has obtained a shared screen that has been turned to be unused and can be provided, the communication terminals registered in the conference-requesting-terminal memory portion are notified of the fact that a shared screen can be provided, and the provision of a shared screens begins.

With this configuration, if all shared screens are used, notifications that shared screens that are released and become usable can be immediately performed, these screens can be assigned, and a smooth system operation becomes possible.

Furthermore, to attain the above object, a computer-readable recording medium stores a program for realizing an apparatus for controlling a shared screen of a shared application that can be shared, in a network system of a plurality of connected communication terminals, by a terminal on which the application is running with other communication terminals, and processing steps of the program comprise a window information acquisition step, wherein the communication terminals acquire window information for the shared application, a window controlling step for controlling how the windows on the communication terminal are displayed, wherein the window controlling step displays, on the communication terminals, a window of shared space wherein windows of the shared application are associated and displayed, and local windows of the communication terminal, and comprises a step of displaying windows of the shared application as subwindows within the window of shared space.

With this configuration, an apparatus for controlling a shared screen in accordance with the present invention can be realized using a computer.

Furthermore, to attain the above object, a computer-readable recording medium stores a program for realizing an apparatus for controlling a shared screen of a shared application of the "entire screen sharing type", wherein, in a network system of a plurality of connected communication terminals, one communication terminal provides a shared screen, and other communication terminals display as one window a shared screen displaying an entire miniaturized screen of the communication terminal providing a shared screen, and processing steps of the program comprise a conference information managing step of managing information about communication terminals participating in a conference held on the network, a shared screen providing step of providing the shared screen, a step wherein the conference managing processing device selects of selecting a communication terminal participating in the conference from the communication terminals on the network based on the information of the conference information managing portion, and a step of providing a shared screen with the shared screen controlling portion to the participating communication terminals selected by the conference managing processing device.

With this configuration, an apparatus for controlling a shared screen in accordance with the present invention can be realized using a computer.

BRIEF DESCRIPTION OF THE DRAWINGS

FIG. 4 is an example of information stored in the shared window database 29 of the first embodiment of the present invention.

DESCRIPTION OF THE PREFERRED EMBODIMENTS

First Embodiment

The following is a description of an apparatus for controlling a shared screen according to a first embodiment of the present invention, with reference to the accompanying drawings.

The apparatus for controlling a shared screen according to the first embodiment is an apparatus for realizing an electronic conference system of the so-called application sharing type, wherein shared application windows are presented to each other among the participants' communication terminals. This device displays a window of shared space, which associates a group of windows of shared applications and displays them together, and displays the windows of the shared applications as sub-windows within the window of shared space. It can be recognized easily whether the windows on the display device are windows of shared applications or windows of unshared applications, and it can be easily recognized who has the authority to operate the shared applications.

Figure 1:
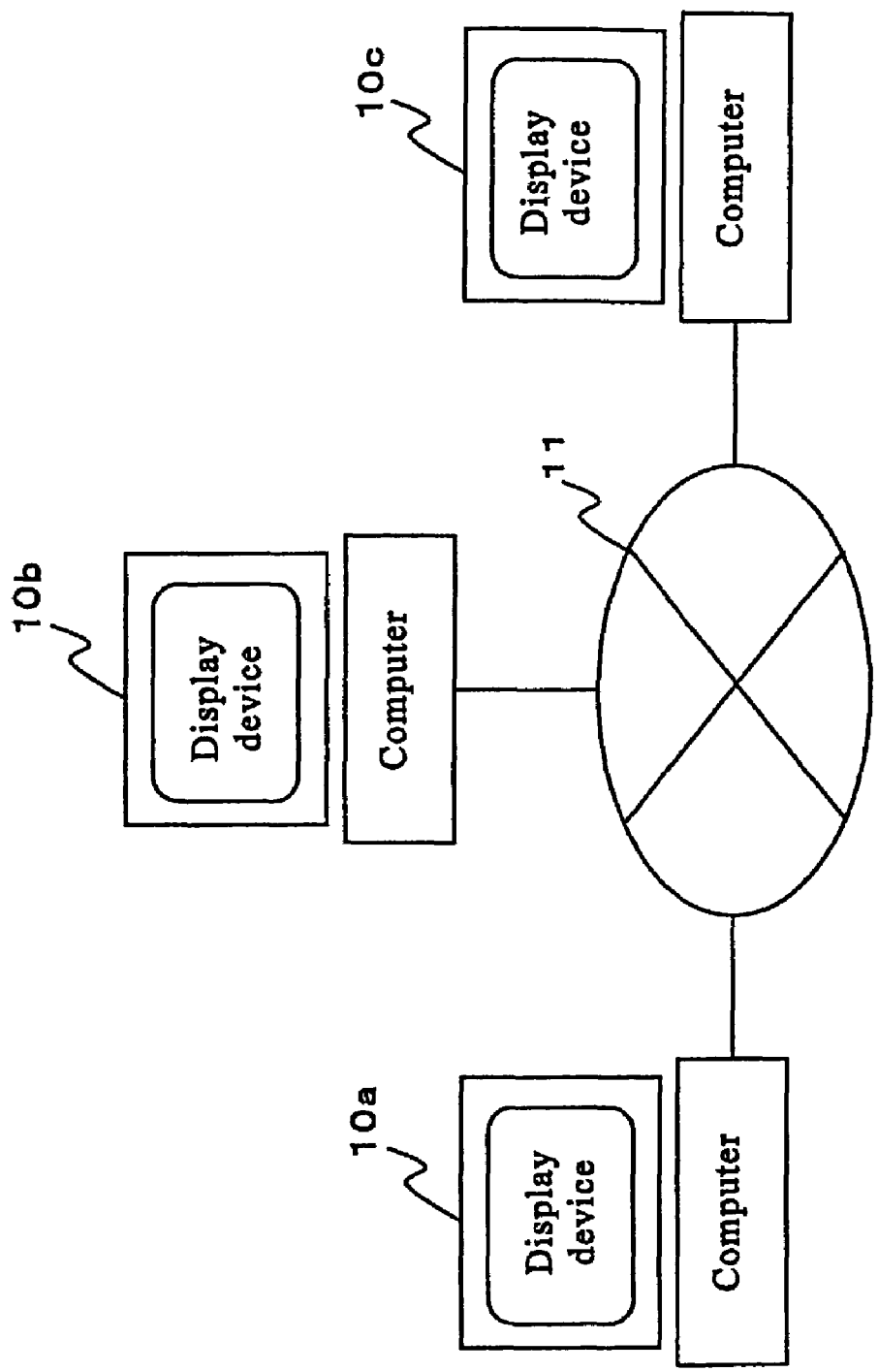
FIG. 1 is an outline of an entire apparatus for controlling a shared screen in accordance with a first embodiment of the present invention.
Figure 2:
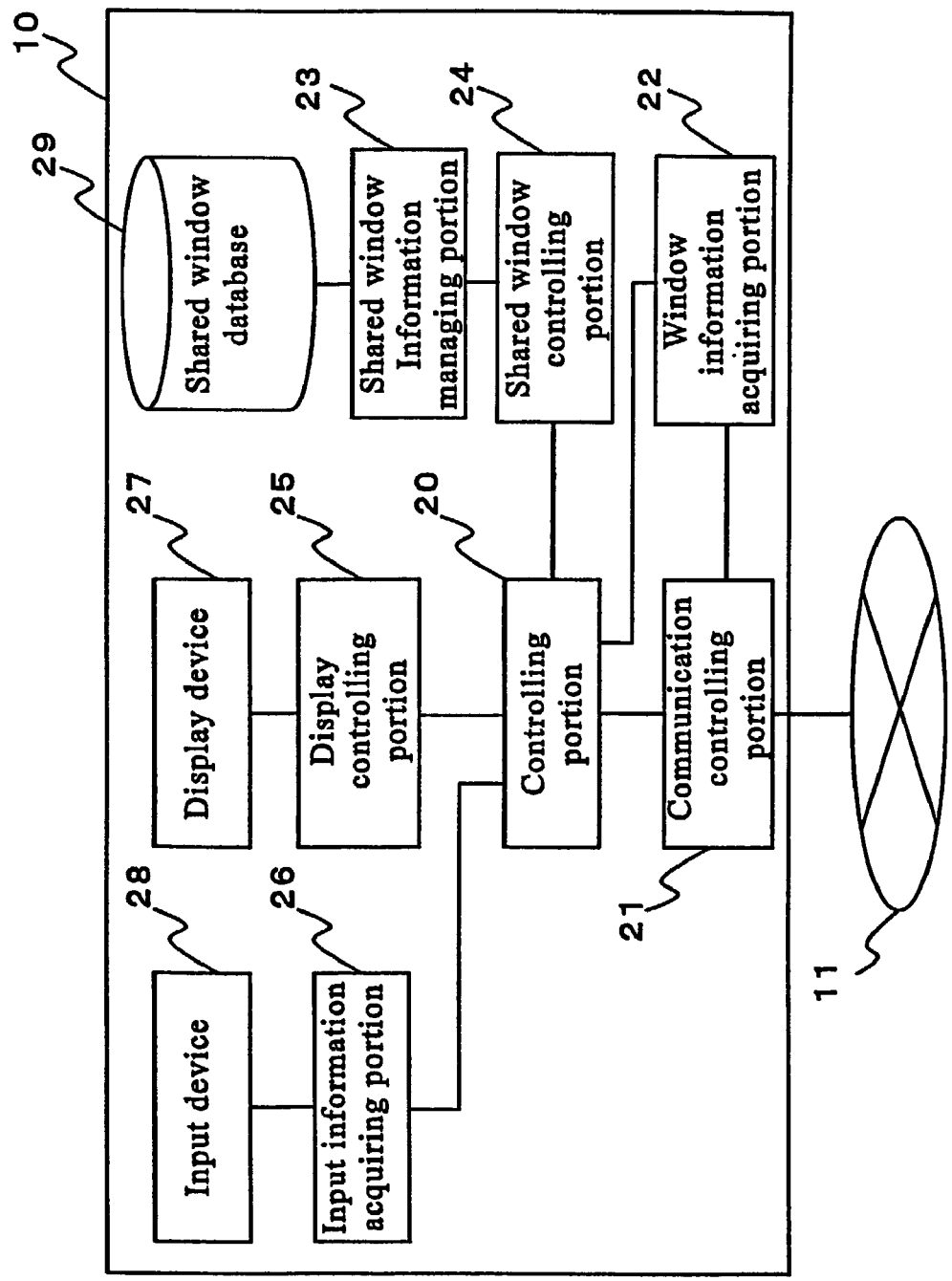
FIG. 2 is a block diagram showing an outline of the basic configuration of a participant communication terminal in accordance with the first embodiment of the present invention.

FIG. 1 illustrates the entire apparatus for controlling a shared screen in accordance with the first embodiment, wherein communication terminals 10 are connected to each other via a network. FIG. 2 is a block diagram illustrating the configuration of the communication terminals 10.

In FIG. 1, numeral 10 denotes a participant communication terminal, and numeral 11 denotes a network. The participant communication terminals 10 can be personal computers provided with the necessary peripherals and software described below, and are connected to the network 11 with a means for controlling communication. The network 11 can be, for example, a LAN (local area network), WAN (wide area network), or the internet The form of the network can be peer-to-peer, that is, all participant communication terminals are on equal terms without a particular network server, but it is also possible to employ a network server (not shown in the drawings).

FIG. 1 shows a configuration with three participant communication terminals 10a to 10c, but there is, of course, no particular limitation to the number of participant communication terminals.

In the block diagram of FIG. 2 illustrating the configuration of the participant communication terminals 10, numeral 20 denotes a controlling portion, numeral 21 denotes a communication controlling portion, numeral 22 denotes a window information acquiring portion, numeral 23 denotes a shared-window information managing portion, numeral 24 denotes a shared-window controlling portion, numeral 25 denotes a display controlling portion, numeral 26 denotes an input information acquiring portion, numeral 27 denotes a display device, numeral 28 denotes an input device, and numeral 29 denotes a shared-window database (in the following, "database" is occasionally abbreviated as "DB"). In order to keep the explanations simple, memories and other structural elements have been omitted where appropriate.

The controlling portion 20 controls the processing for the entire participant communication terminal 10.

The communication controlling portion 21 provides a communication interface for data transmission with other participant communication terminals via the network 11.

The window information acquiring portion 22 acquires window information for displaying a window of a shared application running on the same terminal or a shared application running on another participant communication terminal via the communication controlling portion 21. Based on the information acquired by this window information acquiring portion 22, the windows of shared applications are displayed within a shared window.

The shared-window information managing portion 23 manages, in a window information table, the window information for the various shared application acquired by the window information acquiring portion 22, and manages information of all shared applications that are shared among the participant communication terminals on the network 11 constituting the apparatus for controlling a shared screen. Moreover, operation authority information concerning the authority to operate a later-explained window 41 of shared space and windows 42 of shared applications is also managed in the operation authority information table.

Figure 3:
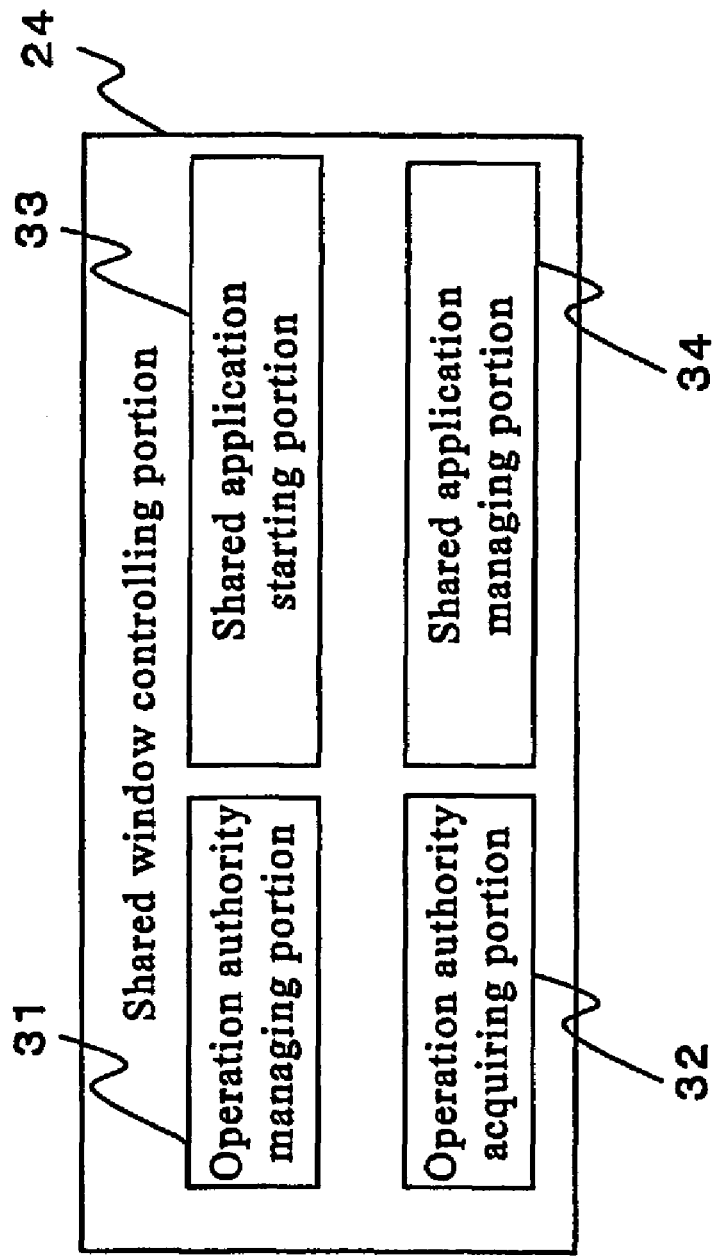
FIG. 3 is a block diagram showing an outline of the basic configuration of the shared window controlling portion 24 of the first embodiment of the present invention.
Figure 5:
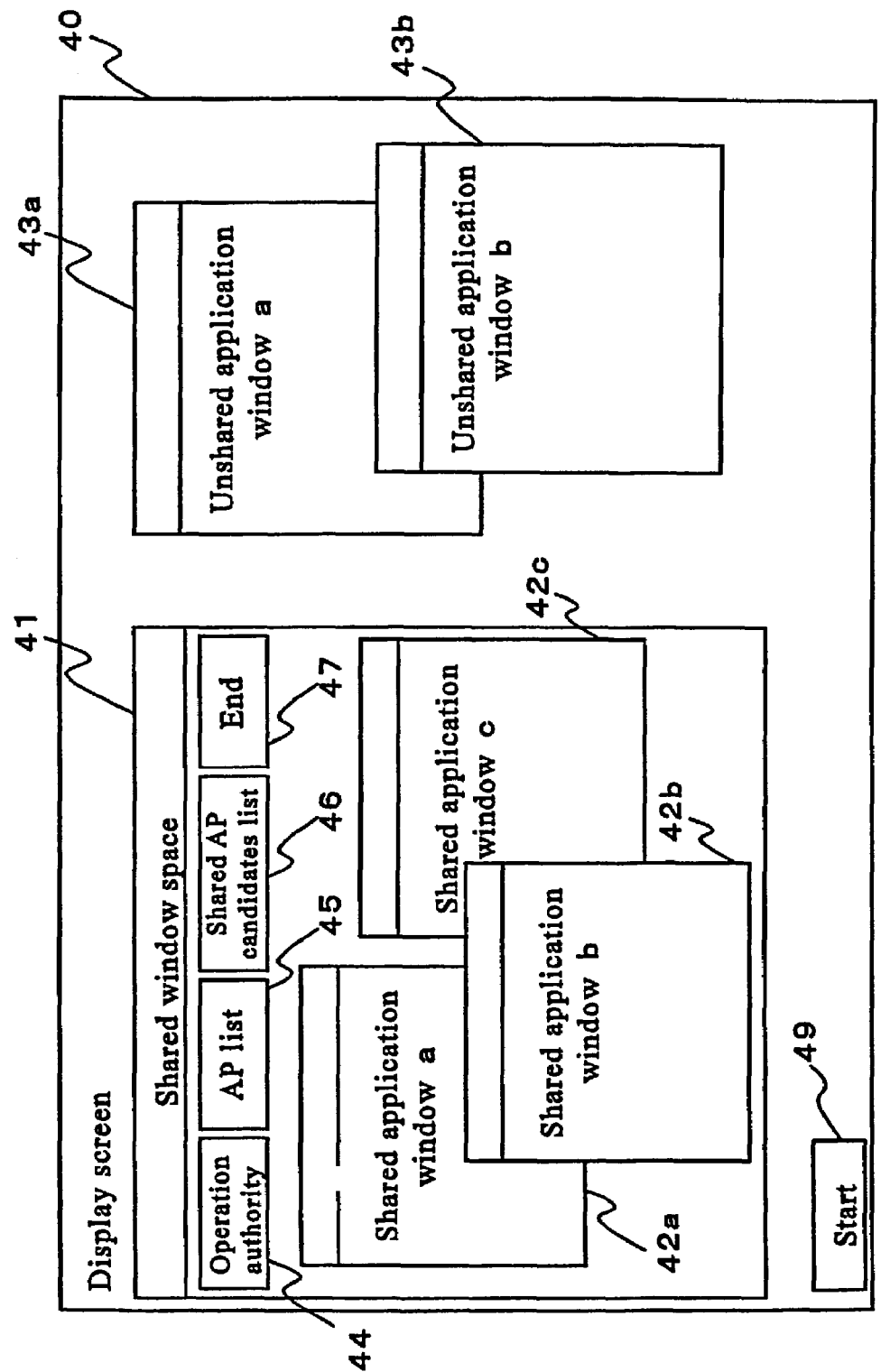
FIG. 5 is an example of a display screen as displayed on the display device 27 of the communication terminals of the first embodiment of the present invention.

The shared-window controlling portion 24 controls the display of the window of shared space. This window of shared space associates windows of shared applications and displays them together, and the windows of the shared applications are displayed as sub-windows of the window of shared space. The shared-window controlling portion 24 performs the window control for the window of shared space, and controls the various operation inputs relating to the shared applications via the window of shared space. It also processes the display and input acceptance for icons, buttons etc. provided in the window of shared space for various operation inputs as shown in FIG. 5, which is explained below. In the first embodiment, the shared-window controlling portion 24 includes an operation authority managing portion 31 for managing the operation authority for operating the window of shared space explained below, an operation authority acquiring portion 32 for acquiring an operation authority for the window of shared space, a shared-application starting portion 33 for displaying a list of executable applications, and performing processing to start the sharing of a selected application, and a shared-application managing portion 34, as shown in FIG. 3.

The display controlling portion 25 controls the display on the display device 27, in accordance with the control by the controlling portion 20. The display device 27 can be a device that can display windows, such as a CRT (cathode ray tube) or a liquid crystal display device.

The input information acquiring portion 26 accepts data that is input from the input device 28, and transmits it to the controlling portion 20. The input device 28 can be any type of inputting device, for example a keyboard, a mouse, an external storage device, an image capturing device such as a camera, which is necessary for electronic conferences, or a voice input device, such as a microphone.

The shared-window database 29 stores information relating to the windows of shared applications running on the same terminal or on other terminals.

FIG. 4 shows an example of the information stored in the shared-window database 29. As information, there is for example an identifier of the shared-application window 42 displayed in the window 41 of shared space, the display hierarchy of the shared-application windows 42, the addresses of the participant communication terminals participating in the execution, the display coordinates, and bitmap information for the shared-application window 42.

FIG. 5 shows an example of a display screen displayed on the display device 27 of the participant communication terminals 10. As is shown in FIG. 5, the windows displayed on the display screen 40 can be broadly classified into two types: a window 41 of shared space and windows 43 of unshared space (local windows).

The window 41 of shared space associates windows of shared applications and displays them together, so that the windows 42 of the shared applications are displayed as sub-windows within the window 41 of the shared space. Moreover, the window 41 of shared space includes icons and buttons for various operation inputs by the user relating to the shared application. In the example in FIG. 5, it includes an operation authority button 44, an application list button 45, a candidates-for-sharing list button 46, and a end button 47.

The operation authority button 44 is for performing input of a request for acquiring operation authority, which is the authority for operating the window 41 of shared space. By pushing the operation authority button, the operation authority acquiring portion 31 of the shared-window controlling portion 24 tries to acquire operation authority. It is preferable that if it has obtained the operation authority, the operation authority controlling portion 32 manages the operation authority, and inform the user of the acquisition of the operation authority for example by reversing its display or by changing its color.

In this embodiment, there are several types or levels of operation authorities. For example, there is an operation authority, where only the participant communication terminal that has acquired the operation authority can operate exclusively the entire window 41 of shared space, and there is an operation authority where that terminal can only perform a pointing operation with a pointer in the window 42 of the shared applications.

Pushing the application list button 45 displays a pull-down list of running or executable applications, and a mouse-click can select applications from this list and start the sharing of the selected applications. In other words, the application list button 45 provides a means for starting shared applications, and provides an application selecting means for selecting an application executable on the participant communications terminal 10, a means for starting a selected application on the same terminal, and a means to start the sharing of a selected application and providing other participant communication terminals with the necessary information about the sharing of the application.

In the example in FIG. 5, the application list button 45 is displayed within the window 41 of shared space, but it can also be provided outside the window 41 of shared space, for example near the start button 49 in the lower left corner of the display screen.

Pushing the candidates-for-sharing list button 46 displays a list of the currently unshared local applications, which, if selected by the user, are automatically put into sharing and displayed in the shared window.

Pushing the end button 47 gives an instruction to stop sharing of an application.

The windows 43 of unshared applications are local windows of applications running on the same terminal, which are not displayed on the display screens 40 of other participant communication terminals 10.

Figure 6:
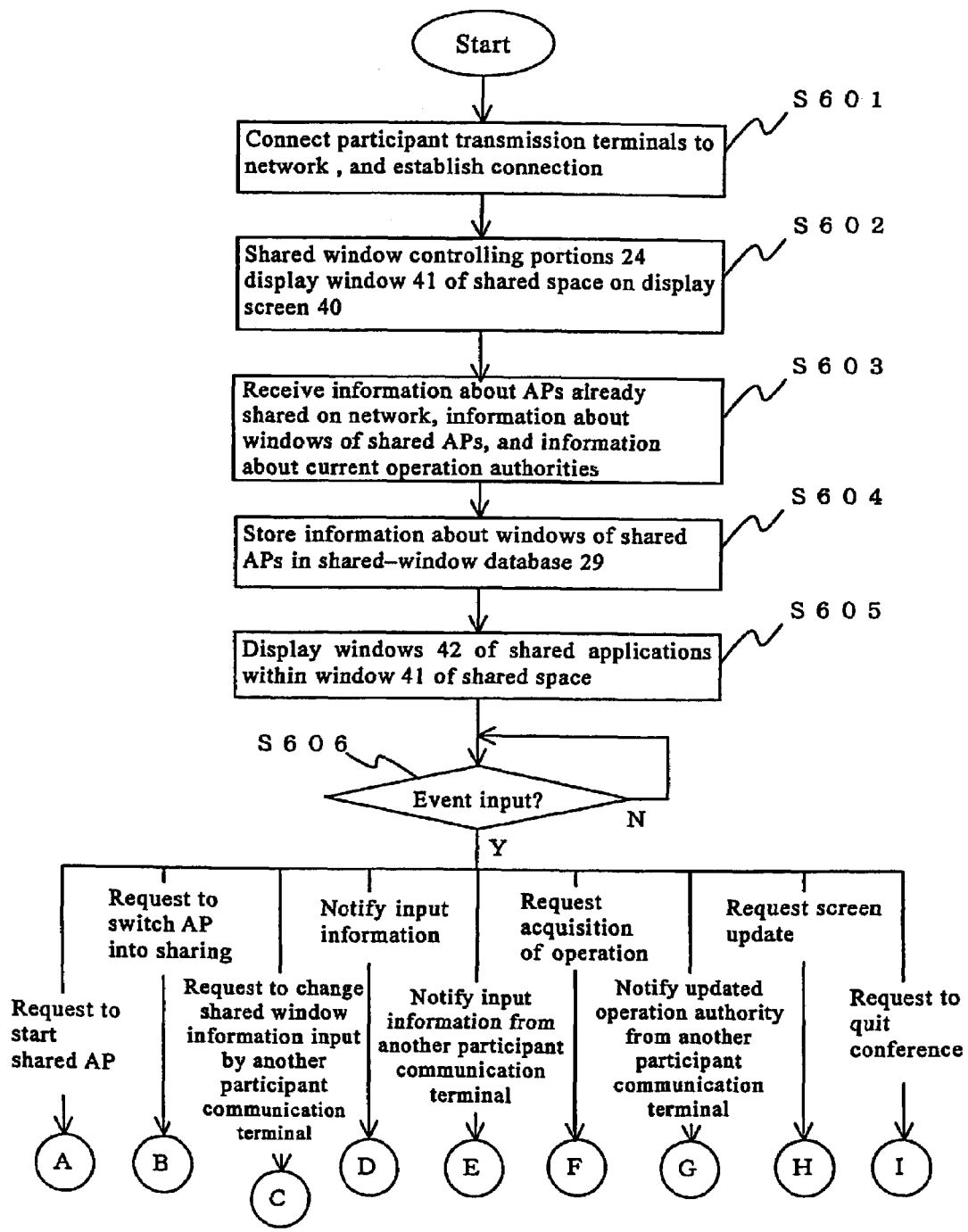
FIG. 6 is a flowchart showing an outline of the entire process flow of an apparatus for controlling a shared screen of the first embodiment of the present invention.

The following is an explanation of examples of the process flow in an apparatus for controlling a shared screen in accordance with the first embodiment, with reference to the flow-charts shown in FIGS. 6 to 14. The flowchart shown in FIG. 6 shows an outline of the entire process flow in the apparatus for controlling a shared screen, whereas FIGS. 7 to 14 each illustrate a portion of the processing steps in detail.

First of all, the flowchart in FIG. 6 showing an outline of the entire process flow in the apparatus for controlling a shared screen is explained.

The participants in an electronic conference connect their participant transmission terminals to the network to participate in the conference, and establish a connection (step S601). The connection processing in this step S601 can be performed in the same order as in a conventional system of the application sharing type, so that a detailed explanation is omitted. In addition to joining a conference from the beginning, it is also possible to join a conference that has already started.

After a connection has been established between the participant communication terminals 10, the shared-window controlling portions 24 of the participant communication terminals 10 display the window 41 of shared space on the display screen 40 (step S602). Several predetermined icons and buttons, such as the operation authority button 44, the application list button 45, the candidates-for-sharing list button 46, and the end button 47, are displayed in the window 41 of shared space.

The participant communication terminals 10 receive information about shared applications that are already- shared on the network, information about windows of shared applications, and information about the current operation authorities (step S603). Here, "information about operation authorities" means information concerning the operation authority for the window 41 of shared space and the windows 42 of shared applications.

The information about windows of shared applications received in step S603 is stored in the shared-window database 29 (step S604). Then, each time the state of the windows 42 of shared applications is updated by the other participant communication terminals 10 on the network, the updated information about windows of shared applications is acquired, and stored in the shared-window database 29.

Then, based on the information of shared applications stored in the shared-window database 29, the windows 42 of shared applications are displayed within the window 41 of shared space, through the display controlling portion 25 (step S605), and the system wait for an event to be entered (step S606).

With the processing of steps S601 to S606, the display screen is formed on the display device 27 shown in FIG. 5.

The following is an explanation of the various operations by the same participant communication terminals and the processing with regard to input information from other participant communication terminals during the electronic conference. In the first embodiment, the following nine input examples illustrate examples of the response to input via an input terminal by the user of the same participant terminal, and for input from other participant terminals sent over the network. The following responses to these inputs are mere examples, and there is no particular restriction to these responses.

The explanation of the branches below step S606 in the flowchart in FIG. 6 is divided into input and response.

Figure 7:
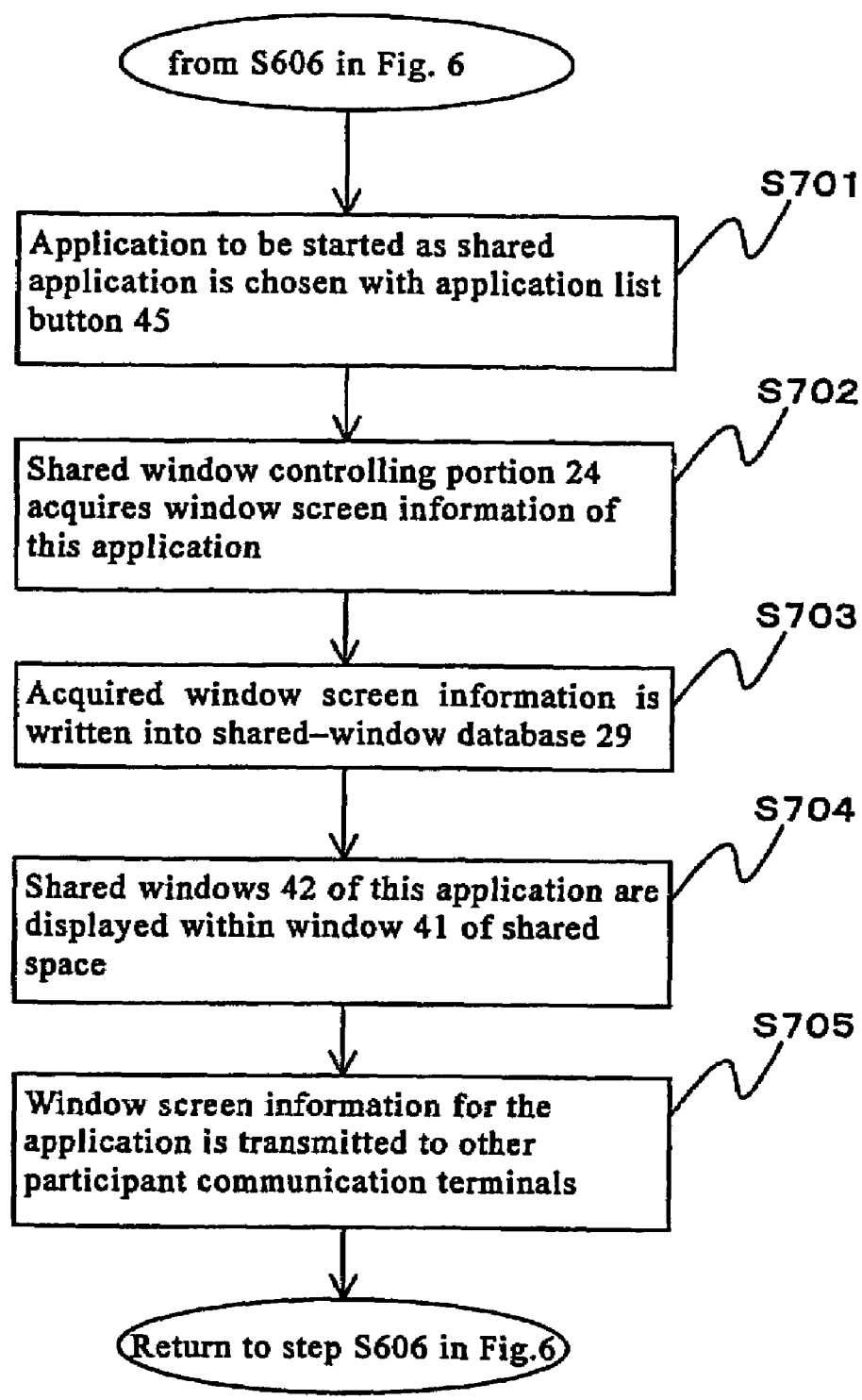
FIG. 7 is a flowchart showing the processing for "A" in the flowchart of FIG. 6 in detail.

First of all, the processing for starting an executable application as a shared application is explained. FIG. 7 is a flowchart showing the processing step indicated as "A" in FIG. 6 in detail.

In the processing for starting an executable application as a shared application, first, the application to be started as a shared application is chosen with the application list button 45 shown in FIG. 5 (step S701).

Then, the shared-window controlling portion 24 acquires the window screen information of this application (step S702), and writes the acquired window screen information into the shared-window database 29 (step S703).

Then, the shared-window controlling portion 24 displays the shared windows 42 of this application within the window 41 of shared space (step S704).

The shared-window controlling portion 24 transmits the window screen information for this application from the shared-window database 29 to the other participant communication terminals over the network (step S705) to update the information for displaying the shared windows 42 of this application within the window 41 of shared space of the other participant communication terminals, and returns to the state of waiting for events of step S606 in FIG. 6.

With the above processing steps S701 to S705, executable applications are started as shared applications.

Figure 8:
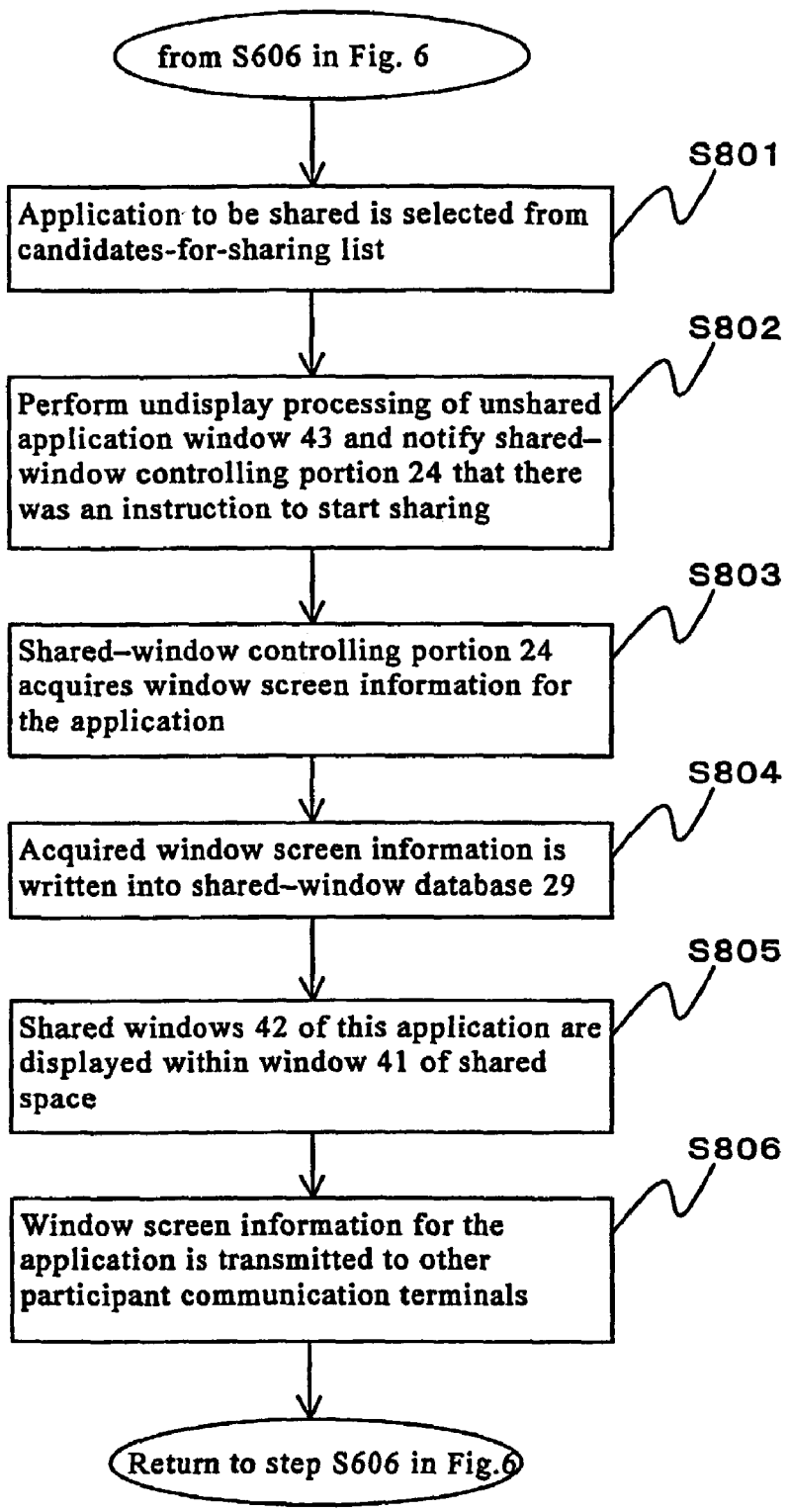
FIG. 8 is a flowchart showing the processing for "B" in the flowchart of FIG. 6 in detail.

The following is an explanation of the processing for changing the status of an application from not sharing to sharing, indicated as "B" in FIG. 6. FIG. 8 is a flowchart showing the processing steps indicated as "B" in FIG. 6 in detail.

In the processing for changing an unshared application into a shared application, first of all, an application to be shared is selected from the candidates-for-sharing list (step S801).

When an unshared application is selected from the candidates-for-sharing list, the controlling portion 20 and the display controlling portion 25 perform undisplay processing (remove processing) of the unshared application window 43 and notify the shared-window controlling portion 24 of the fact that there was an input instruction to start sharing (step S802).

The shared-window controlling portion 24 acquires the window screen information for this application (step S803), writes the acquired window screen information into the shared-window database 29 (step S804), and displays the shared windows 42 of this application within the window 41 of shared space (step S805).

The shared-window controlling portion 24 transmits the window screen information for this application from the shared-window database 29 to the other participant communication terminals over the network (step S806), to update the information for displaying the shared windows 42 of this application within the window 41 of shared space of the other participant communication terminals, and returns to the state of waiting for events of step S606 in FIG. 6.

With the above processing steps S801 to S806, unshared applications are turned into shared applications.

Figure 9:
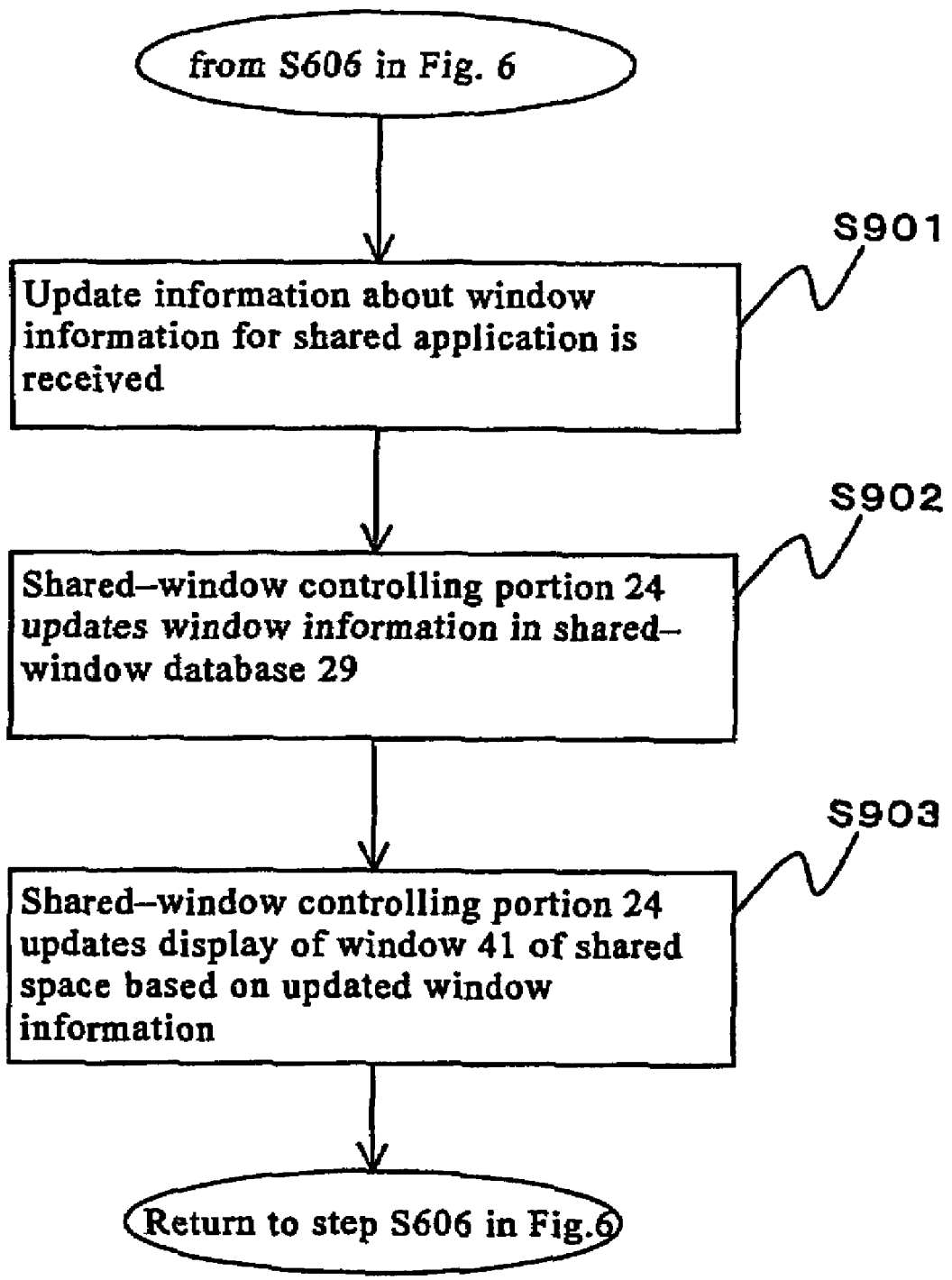
FIG. 9 is a flowchart showing the processing for "C" in the flowchart of FIG. 6 in detail.

The following is an explanation of the processing for an operation input from another participant communication terminal relating to a change of shared window information, indicated by "C" in FIG. 6. This is the processing for the case of a change relating to the windows 42 of the shared application, for example to begin sharing of a new application caused by another participant communication terminal. FIG. 9 is a flowchart showing the processing steps of "C" in FIG. 6 in detail.

The processing of an operation input from another participant communication terminal relating to a change of shared window information starts with receiving update information about window information for a shared application, for example the addition of a window 42 of a shared application by another participant communication terminal via the network 11 (step S901).

The shared-window controlling portion 24 updates the window information in the shared-window database 29 in accordance with the update information for window information of a shared application received via the communication controlling portion 21 and the controlling portion 20 (step S902).

Then, based on the updated window information in the shared-window database 29, the shared-window controlling portion 24 updates the display of the window 41 of shared space with the display controlling portion 25 (step S903), and returns to the state of waiting for events of step S606 in FIG. 6.

With the above processing steps S901 to S903, the processing of an operation input from another participant communication terminal relating to a change of shared window information is performed.

Figure 10:
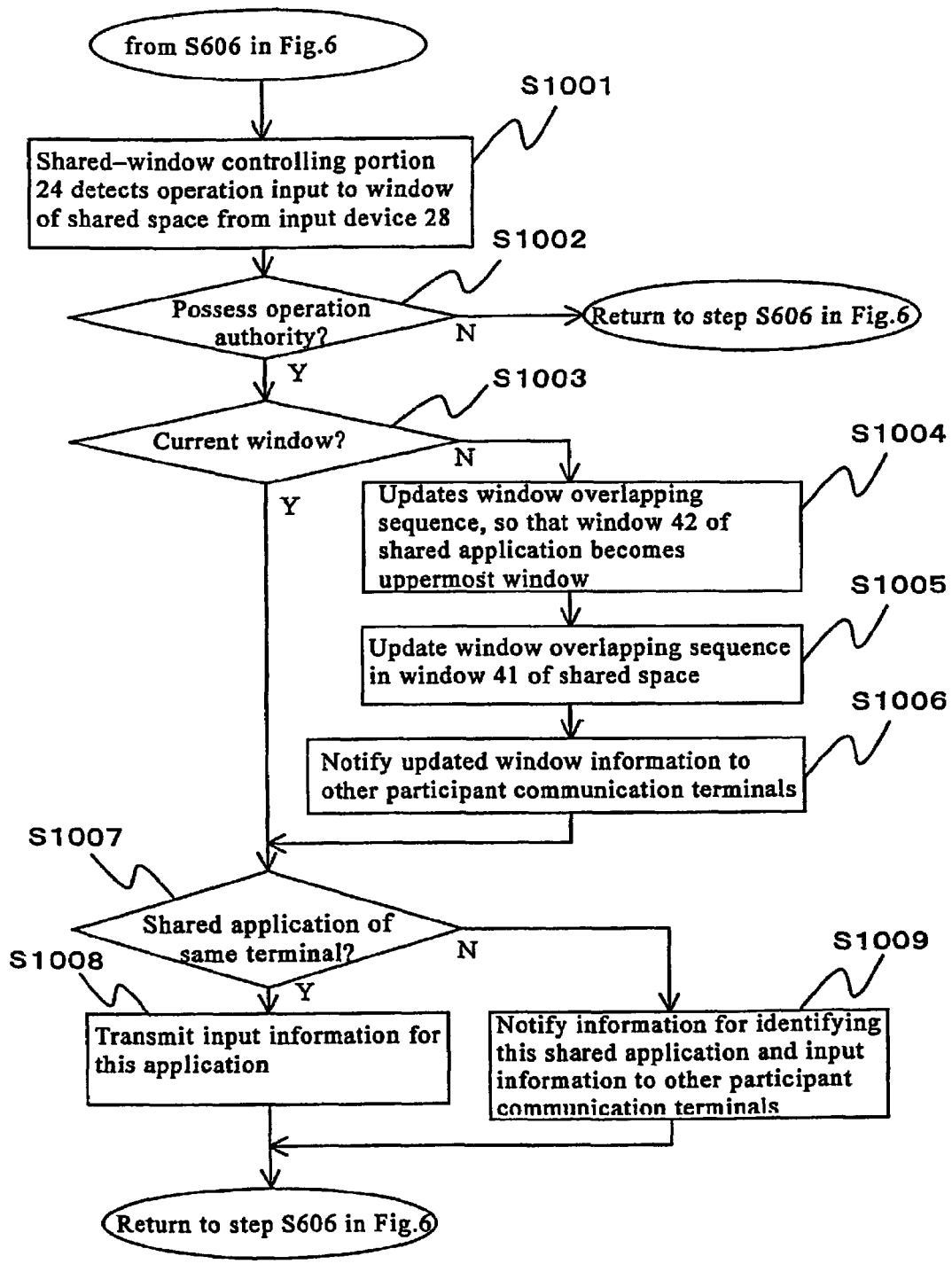
FIG. 10 is a flowchart showing the processing for "D" in the flowchart of FIG. 6 in detail.

The following is an explanation of the processing for an operation input relating to a window 42 of a shared application, indicated by "D" in FIG. 6. This is the processing for the case that information is input by operating the shared application using the input device 28. FIG. 10 is a flowchart showing the processing steps of "D" in FIG. 6 in detail.

The processing for an operation input relating to a window 42 of a shared application starts when the shared-window controlling portion 24 detects an operation input to the window of shared space from the input device 28 (step S1001). Here, it is assumed that a point input by a mouse has been detected in the window 41 of shared space.

When this operation input is detected, the shared-window controlling portion 24 checks whether it has the operation authority for the window of shared space (step S1002). If the result of this check is that it does not have the operation authority (step S1002: N), the input operation is ignored, and it returns to the state of waiting for events of step S606 in FIG. 6. If it has the operation authority for the window of shared space (step S1002: Y), the procedure advances to step S1003.

In step S1003, the overlapping of the windows 42 of a shared application in the window 41 of shared space is checked. This means, it is checked whether the window 42 of a shared application including the coordinates of the point input is the current window (uppermost window) in the window 41 of shared space (step S1003). If the result of this check is that this window 42 of a shared application is the current window in the window 41 of shared space (step S1003: Y), the procedure advances to step S1007. If the result of this check is that this window 42 of a shared application is not the current window in the window 41 of shared space (step S1003: N), the procedure advances to step S1004.

In step S1004, the shared-window controlling portion 24 changes and updates the window overlapping sequence in the shared-window database 29, so that the window 42 of a shared application including the coordinates of the point input is now the uppermost window.

The shared-window controlling portion 24 updates the window overlapping sequence in the window 41 of shared space based on the updated window information in the shared-window database 29 (step S1005). Furthermore, the shared-window controlling portion 24 notifies the updated window information in the shared-window database 29 to the other participant communication terminals via the network 11 (step S1006), and lets the other participant communication terminals update the display of the display screen 40 on the display device 27.

With the above processing steps S1003 to S1006, the window 42 of a shared application including the coordinates of the point input becomes the uppermost, current window in the window 41 of shared space.

Then, the shared-window controlling portion 24 checks whether this shared application has been started and executed by the same participant terminal (of this shared-window controlling portion 24) (step S1007). If the application is running on the same participant communication terminal (step S1007: Y), then it transmits the input information for this application (step S1008). In this example, the point input is transmitted. If the display of the window 41 of shared space is changed due to the processing of the shared application based on this input information, then a display screen update processing is performed based on the processing indicated as "E" in FIG. 6 described later.

If the application is not running on the same participant communication terminal but on another participant communication terminal (step S1007: N), then the information for identifying this shared application and the input information (in this example the point input) are notified to this other participant communication terminal via the network 11 (step S1009).

With the above processing steps S1001 to S1009, the processing for an operation input relating to a window 42 of a shared application is performed.

The following is an explanation of the processing for an input information notification relating to a window 42 of a shared application received from another participant communication terminal, indicated by "E" in FIG. 6. This is the processing for the case that information is input by operating the shared application from another participant communication terminal, and on this other participant communication terminal, the information for identifying this shared application and the input information is notified with the processing of step S1009 shown in "D" of FIG. 6.

Figure 11:
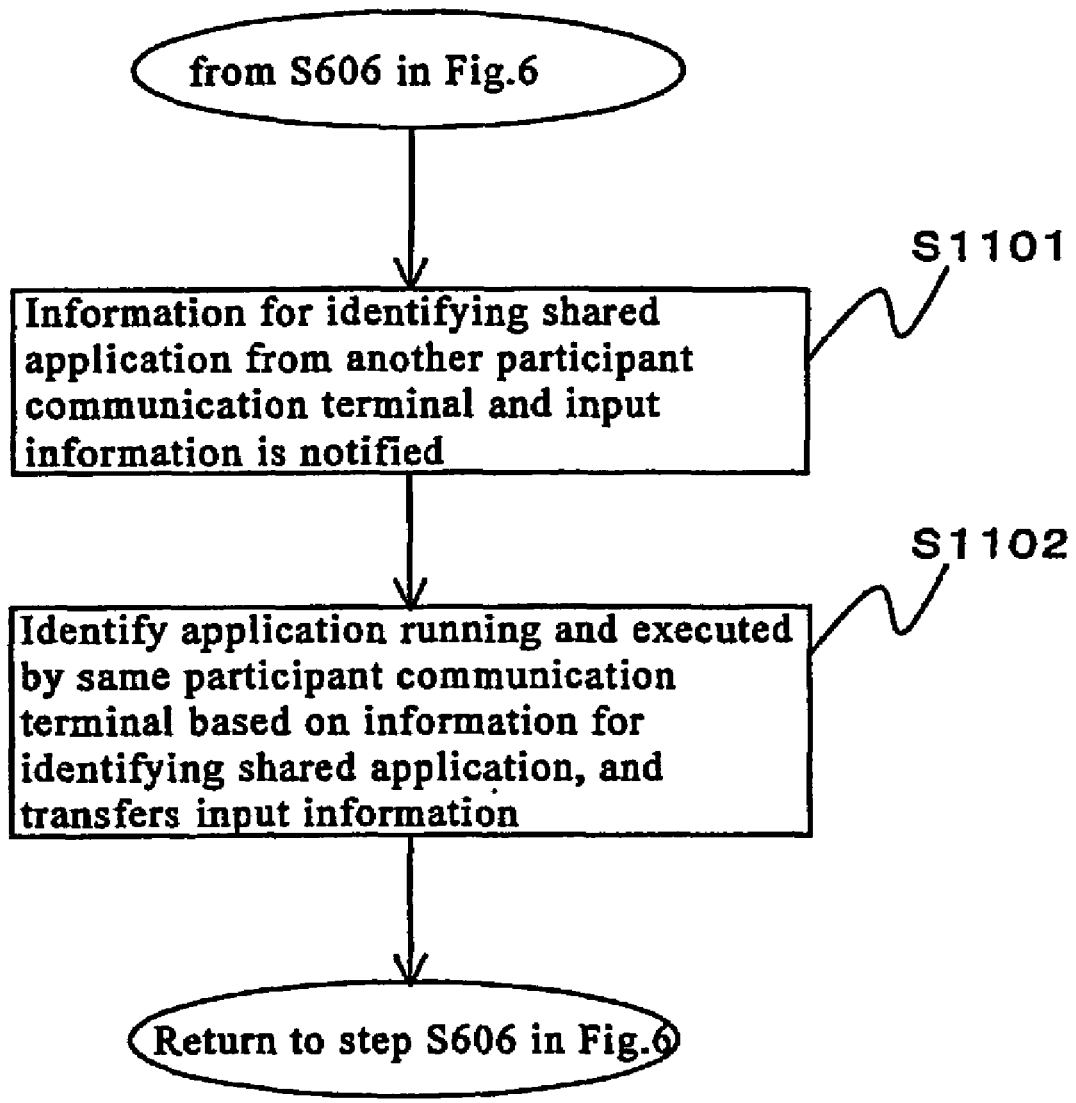
FIG. 11 is a flowchart showing the processing for "E" in the flowchart of FIG. 6 in detail.

FIG. 11 is a flowchart showing the processing steps of "E" in FIG. 6 in detail. Here, it is assumed that the processing steps S1001 to S1007 and S1009 shown in FIG. 10 are executed on another participant communication terminal. These processing steps on another participant communication terminal are omitted from the flowchart in FIG. 11.

The processing for an operation input relating to a window 42 of a shared application from another participant communication terminal begins when the information for identifying the shared application from another participant communication terminal and the input information has been notified (step S1101). Here, it is assumed that a point input by a mouse on the window 41 of shared space is detected.

When the shared-window controlling portion 24 detects this operation input, it identifies the application running and executed by the same participant communication terminal based on the information for identifying the shared application, and transfers the input information (step S1102). Due to the processing of the steps S1003 to S1006 in FIG. 10, the window 42 of the shared application including the coordinates of the point input become the uppermost, current window in the window 41 of shared space, and the input information can be transferred to this application. Due to the processing of the shared application based on the input information, the processing indicated by "H" in FIG. 6, which is explained below, updates the display screen, if the display of the window 41 of shared space changes.

With these steps S1101 to S1102 in FIG. 11, the processing for an operation input relating to the window 42 of the shared application by another participant terminal is performed.

Figure 12:
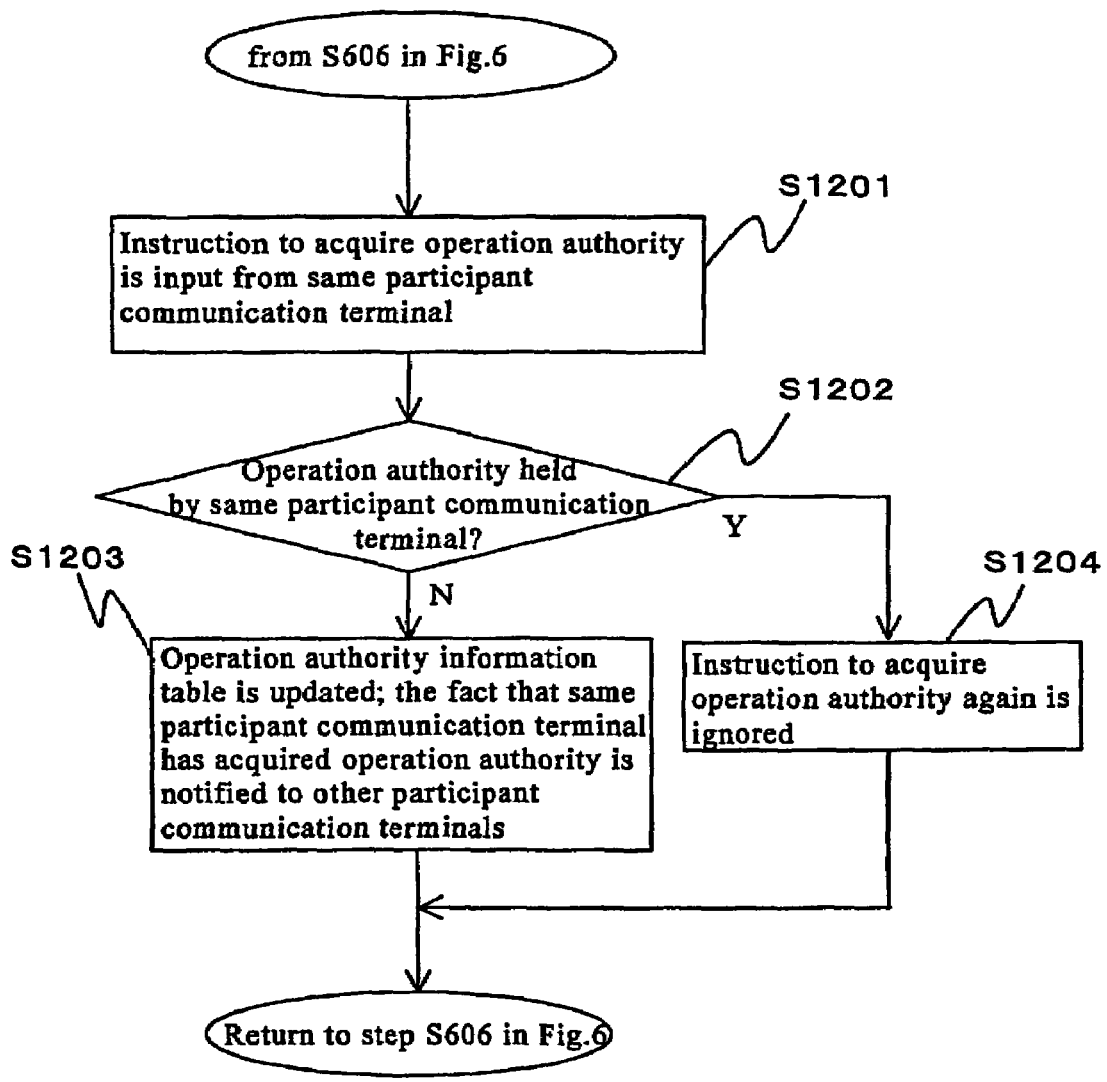
FIG. 12 is a flowchart showing the processing for "F" in the flowchart of FIG. 6 in detail.

The following is an explanation of the processing for acquiring the operation authority, indicated as "F" in FIG. 6. This is the processing for obtaining the operation authority for the window of shared space. If the operation authority is set for each shared application, the following processing is performed for each window 42 of the shared application. FIG. 12 shows a flowchart showing the processing steps indicated as "F" in FIG. 6 in detail.

The processing with regard to acquiring the operation authority begins when an instruction to acquire the operation authority is input from the same participant communication terminal (step S1201). The input of this instruction can be for example a command input, an input with a function key, or it can be an event generated by clicking the icon for authority operation acquisition.

When an input instructing the acquisition of the operation authority is detected, the shared-window controlling portion 24 checks whether the operation authority is held by the same participant communication terminal, using an operation authority information table held and managed by the shared-window information managing portion 23 (step S1202). If the participant communication terminal where the instruction was input does not hold the operation authority (step S1202: N), then the operation authority information table is updated, and the network is notified of the updated operation authority information, that is, the fact that the same participant communication terminal has acquired the operation authority is notified to the other participant communication terminals (step S1203). If the participant communication terminal where the instruction was input does hold the operation authority (step S1202: Y), then the instruction to acquire the operation authority again is ignored, because it already has been obtained (step S1204). It is preferable that after the operation authority has been acquired, the window that has acquired the operation authority on the display screen of the participant communication terminal is immediately recognizable. For example, the color of the window frame (or the title bar) can be changed to certain color.

With these steps S1201 to S1204 in FIG. 12, the processing for an input instructing the acquisition of the operation authority on the same participant communication terminal is performed.

Figure 13:
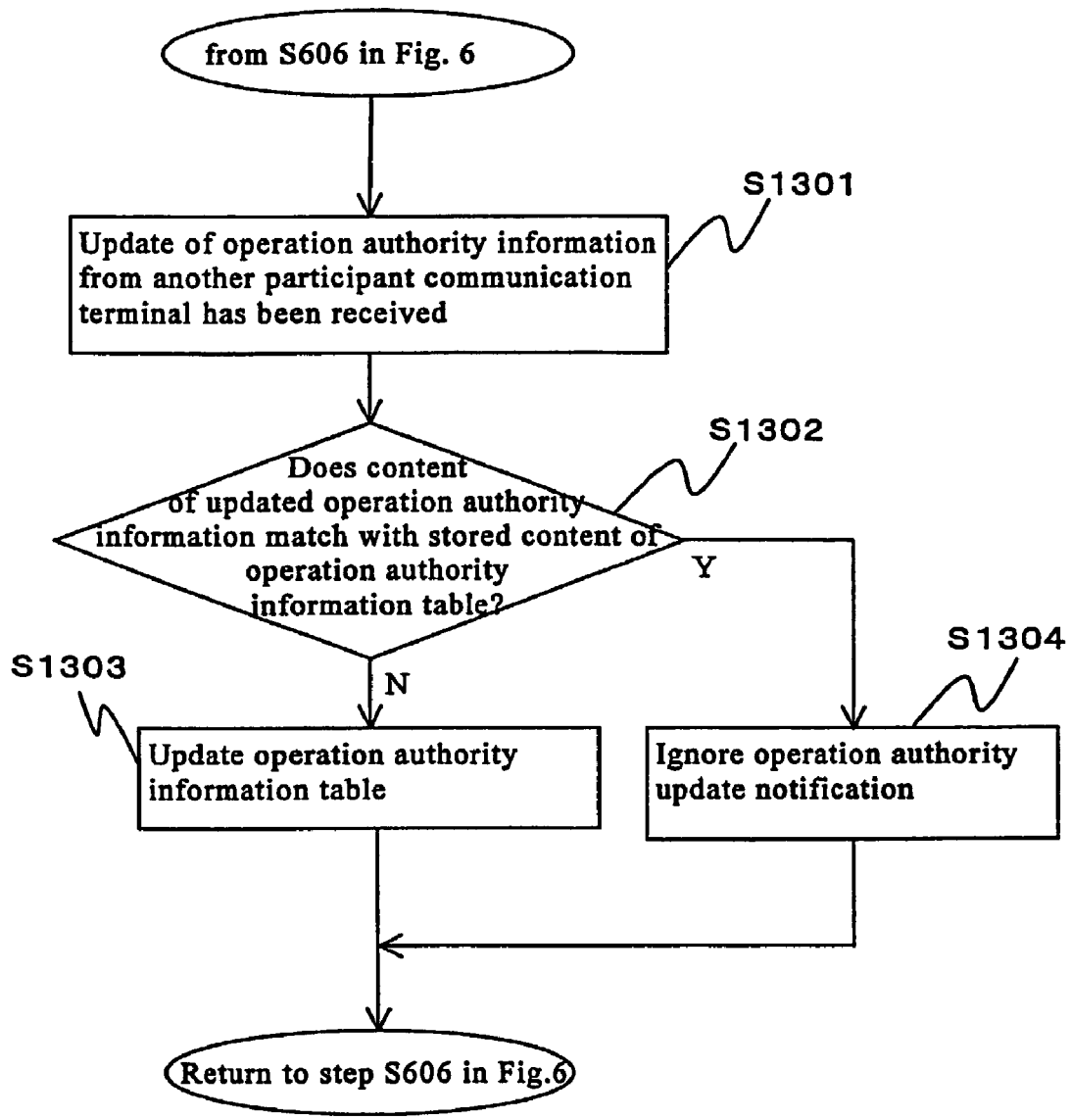
FIG. 13 is a flowchart showing the processing for "G" in the flowchart of FIG. 6 in detail.

The following is an explanation of the processing for updating the operation authority information, indicated as "G" in FIG. 6. This is the processing in the participant communication terminal that is notified when the operation authority information is updated on the network in step S1203 in FIG. 12. FIG. 13 is a flowchart showing the processing steps indicated as "G" in FIG. 6 in detail.

The processing for updating the operation authority information from the network begins when an update of the operation authority information has been notified from another participant communication terminal over the network (step S1301). When a notification of an update of operation authority information is detected, the shared-window controlling portion 24 checks whether the content of the updated operation authority information matches with the stored content of an operation authority information table held and managed by the shared-window information managing portion 23 (step S1302). If the content of the updated operation authority information does not match the stored content of the operation authority information table (step S1302: N), then the operation authority information table is updated (step S1303). If the content of the updated operation authority information does match the stored content of the operation authority information table (step S1302: N), then the update notification is ignored (step S1304).

With these steps S1301 to S1304 in FIG. 13, the processing notifying an update of the operation authority information from another participant communication terminal over the network is performed.

The following is an explanation of the processing for updating the display screen. This corresponds to the processing step indicated by "H" in FIG. 6, and is the processing when the display screen of the window 41 of shared space or a window 42 of a shared application is updated, as can occur for example when processing for an operation input relating to a window 42 of a shared application as indicated by "D" in FIG. 6, processing for an input information notification relating to a window of a shared application received from another participant communication terminal as indicated by "E" in FIG. 6, processing for acquiring the operation authority, indicated as "F" in FIG. 6, or processing for updating the operation authority information, indicated as "G" in FIG. 6.

Figure 14:
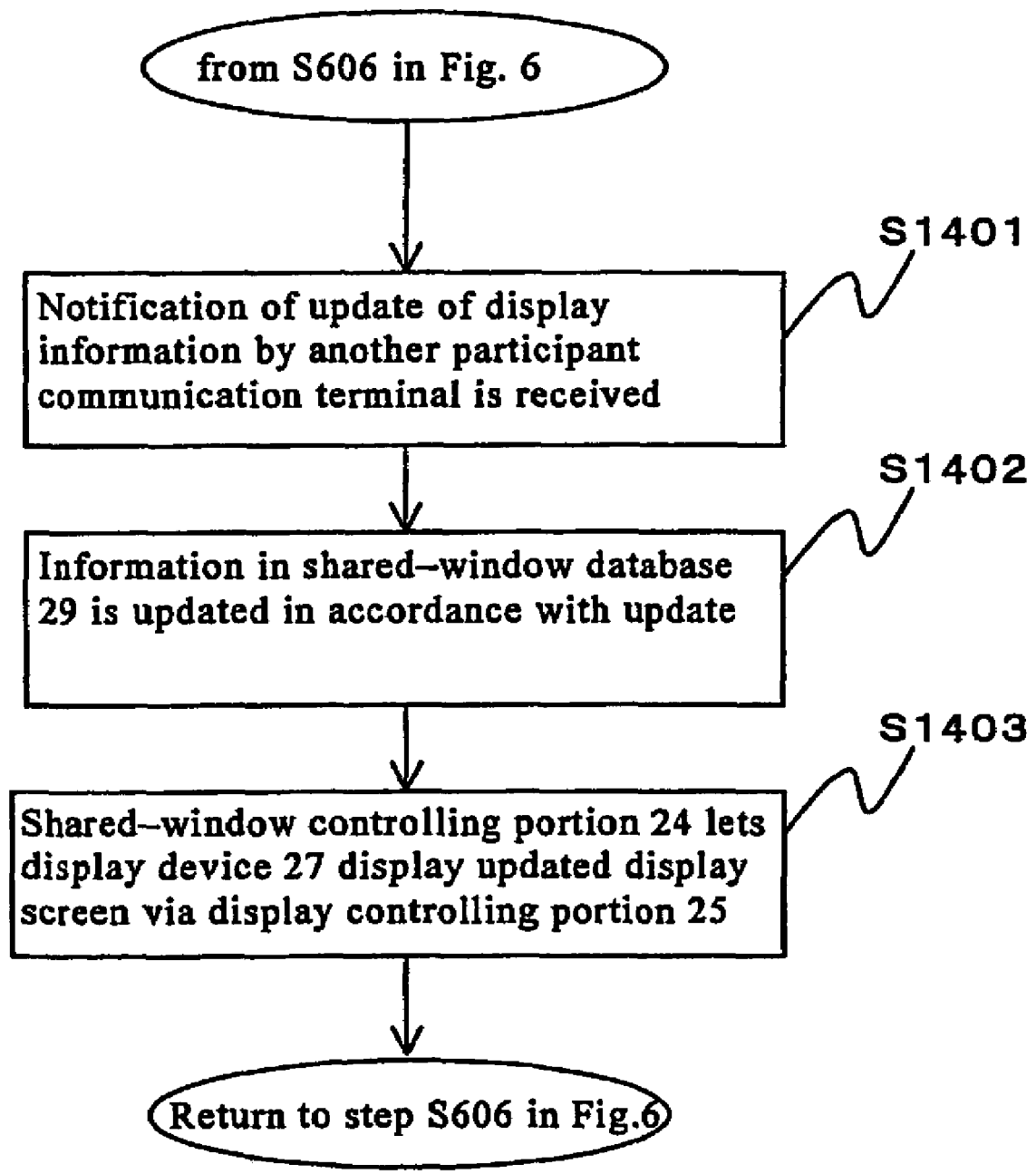
FIG. 14 is a flowchart showing the processing for "H" in the flowchart of FIG. 6 in detail.

FIG. 14 shows a flowchart showing the processing steps for updating the screen, indicated as "H" in FIG. 6, in detail.

The processing with respect to the update of the display screen begins when a participant communication terminal is notified via the network of an update of display information by another participant communication terminal (step S1401). When the shared-window controlling portion 24 detects that the display information relating to the display screen of the window 41 of shared space or the window 42 of a shared application held and managed by the shared-window information managing portion 23 is updated, the information in the shared-window database 29 is updated in accordance with the update (step S1402). Via the display controlling portion 25, the shared-window controlling portion 24 lets the display device 27 display the updated display screen (step S1403).

With these steps S1401 to S1403 in FIG. 14, the processing for updating the display screen is performed.

The following is an explanation of the processing for quitting the electronic conference, indicated as "I" in FIG. 6. This is the processing for quitting an electronic conference, in which the participant communication terminal was taking part.

Figure 15:
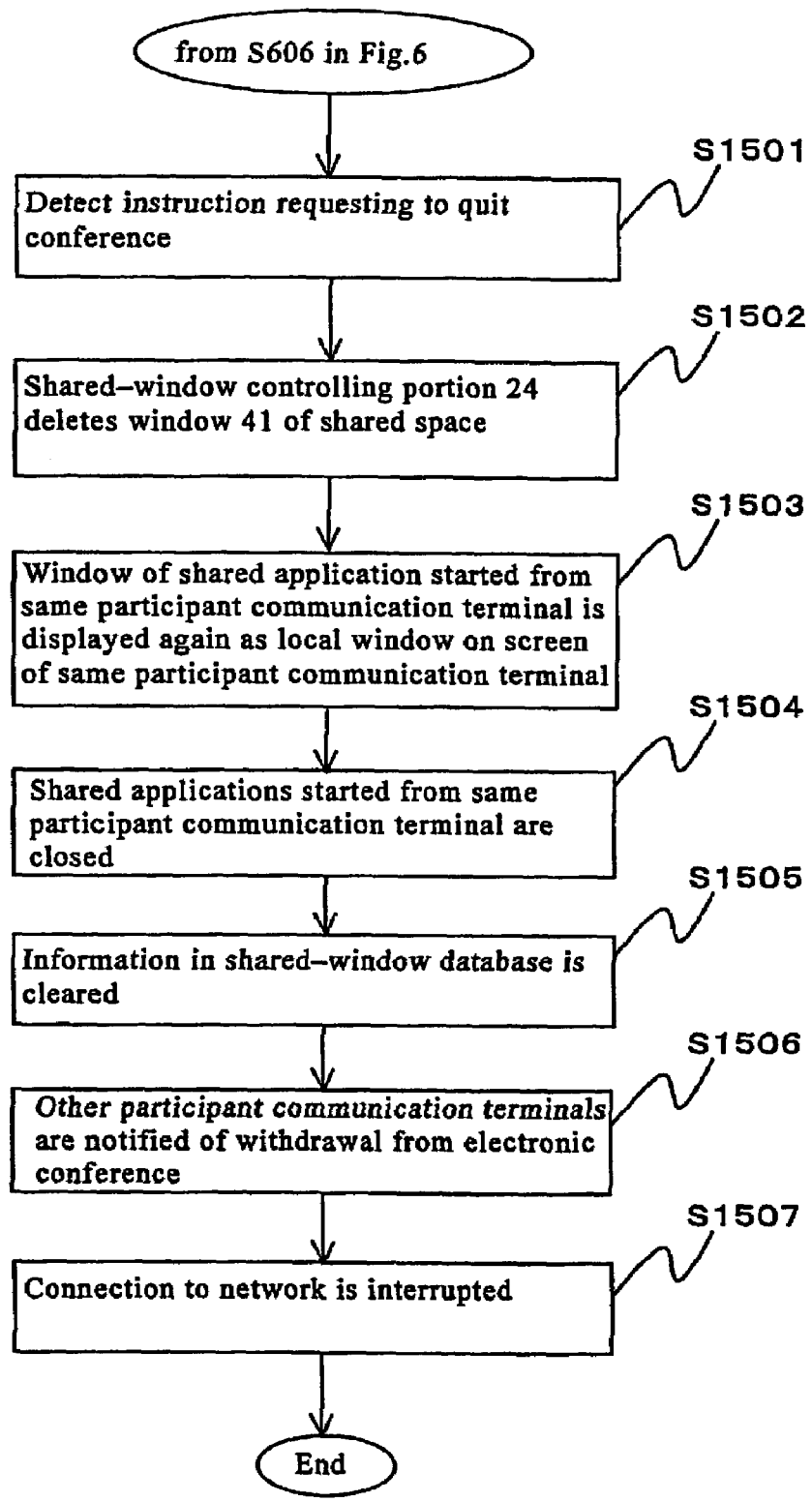
FIG. 15 is a flowchart showing the processing for "I" in the flowchart of FIG. 6 in detail.

FIG. 15 shows a flowchart showing the processing steps for quitting the conference, indicated as "I" in FIG. 6, in detail.

The processing for quitting the conference begins when an instruction requesting to quit a conference is input by a participant communication terminal, and the controlling portion 20 detects this conference quitting request via the input information acquiring portion 26 (step S1501). The controlling portion 20 notifies the shared-window controlling portion 24 that the process of quitting the conference has begun, the shared-window controlling portion 24 deletes the window 41 of shared space on the same participant communication terminal (step S1502), and the window of the shared application started from the same participant communication terminal is displayed again as a local window on the screen of this same participant communication terminal (step S1503). The shared application started from other participant communication terminals are not displayed. Then, the shared applications started from the same participant communication terminal are closed (step S1504), and the information in the shared-window database is cleared (step S1505). Thus, the sharing of the application is cancelled. Finally, the controlling portion 20 notifies the other participant communication terminals of the quitting from the electronic conference via the network (step S1506), and interrupts the connection to the network (step S1507).

The above are the examples for the processing operations indicated by "A" to "I" in FIG. 6 on a series of participant communication terminals.

With the apparatus for controlling a shared screen according to the first embodiment of the present invention, an electronic conference system of the application sharing type can be realized. A window of shared space for associating a group of windows of shared applications and displaying them together and a local window of the communication terminal itself can be displayed. The windows of the shared application are displayed as sub-windows in the window of shared space. It can be easily determined whether a window on the display device is a window of a shared application or a window of an unshared application, and it can be easily recognized who has the authority to operate the shared applications.

Second Embodiment

The following is an explanation of an apparatus for controlling a shared screen according to a second embodiment of the present invention, with reference to the accompanying drawings.

The apparatus for controlling a shared screen according to the second embodiment is an apparatus for realizing an electronic conference system of the so-called entire screen sharing type, wherein the entire display screen of one communication terminal connected to the network is sent as a shared screen to other participant communication terminals, and this shared screen is displayed on a portion of the display screen. This apparatus includes a conference management terminal on a network, and with this conference management terminal, one communication terminal is selected to provide a shared screen, so that the network resources can be used efficiently, and the conference management terminal provides an appropriate shared screen. The provided shared screen is a display screen controlled and managed by the conference management terminal itself or one of the diplays of the communication terminals on the network. The terminal providing this shared display screen stores and manages the display screen for the electronic conference, and participating in the indicated conference, it initiates sharing of its own screen. Moreover, the terminal for providing a shared screen can be designated in advance, but it is also possible to dynamically decide an unused terminal for the terminal for providing a shared screen on demand.

Figure 16:
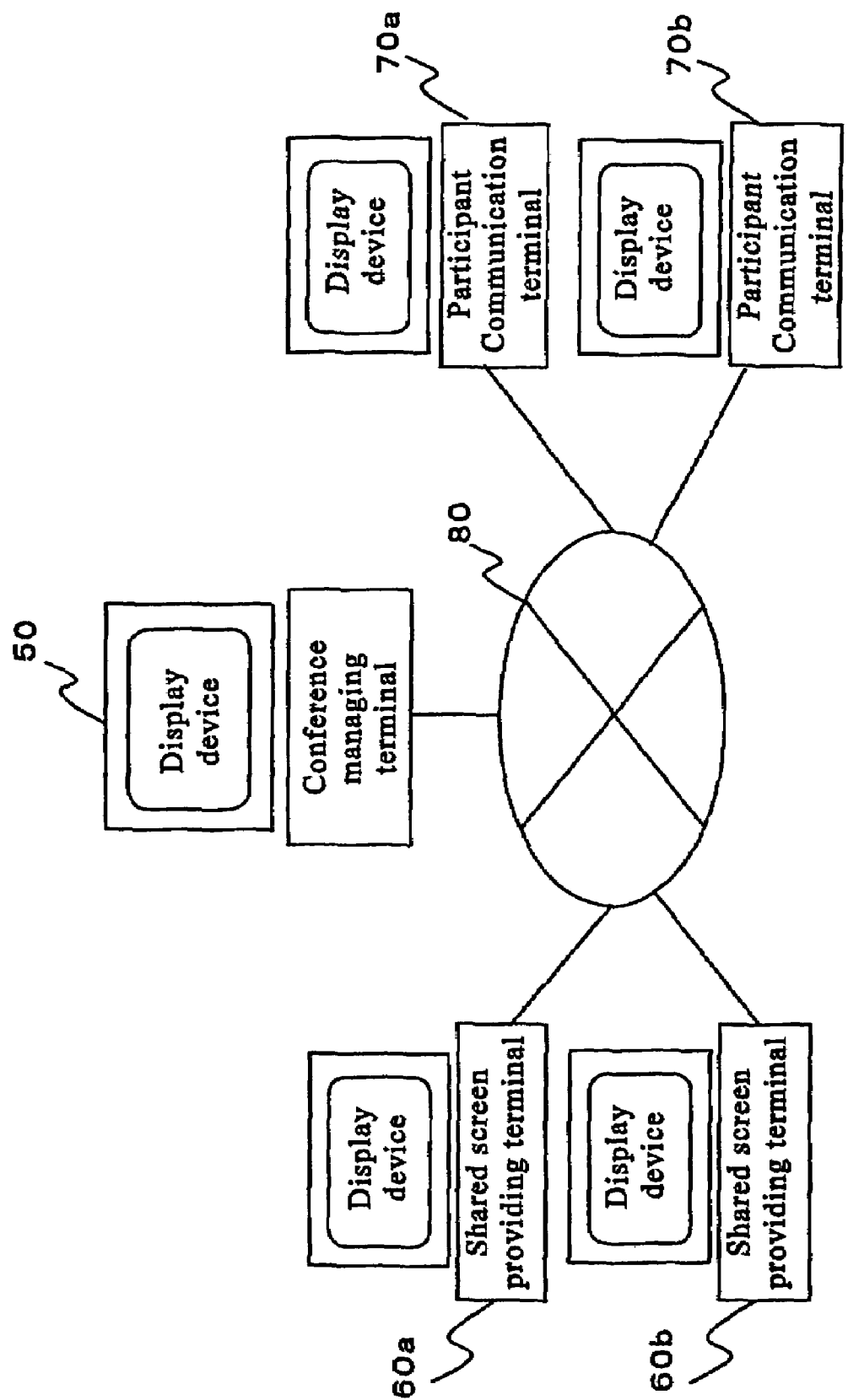
FIG. 16 is an outline of the entire apparatus for controlling a shared screen in accordance with a second embodiment of the present invention.
Figure 17:
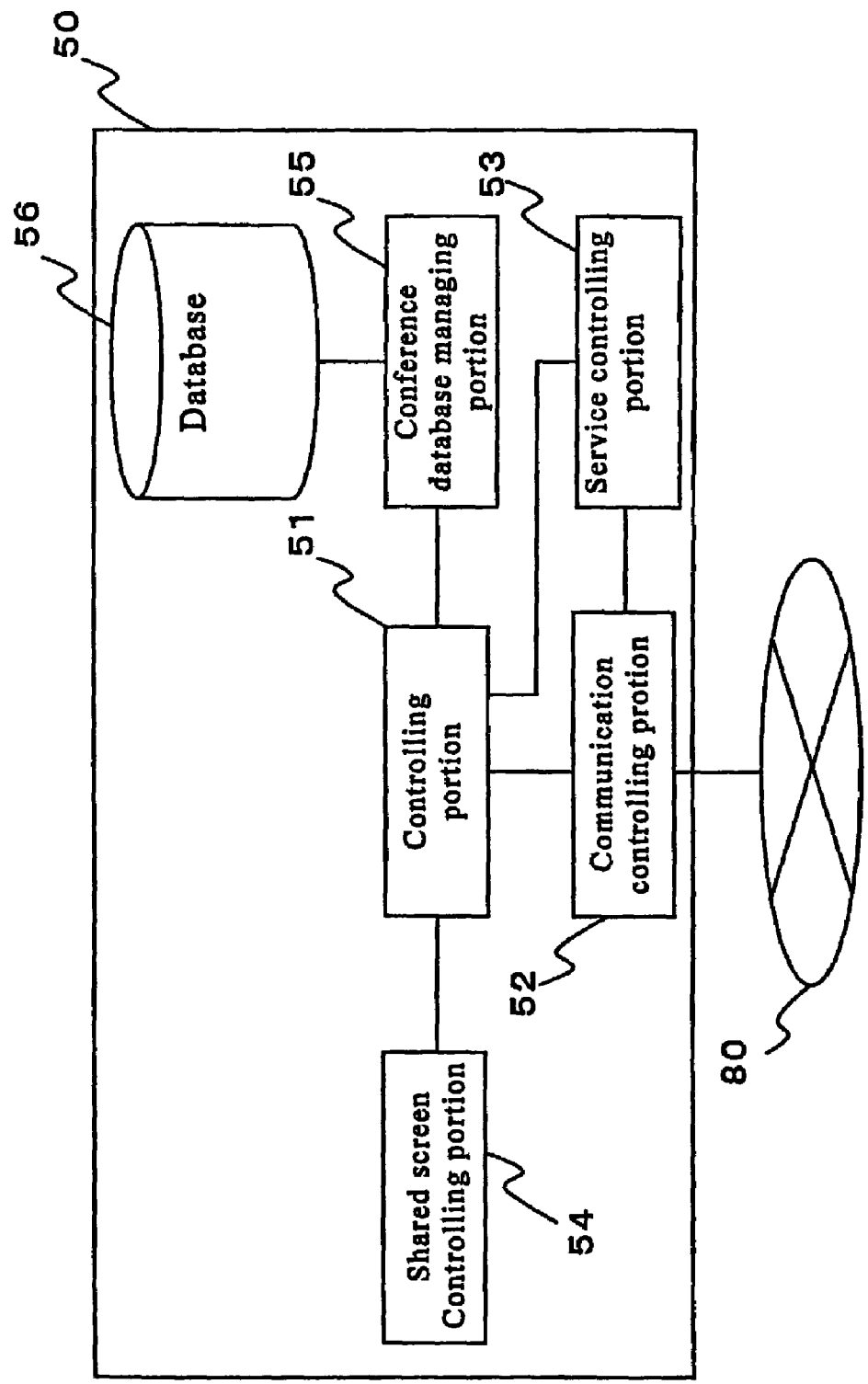
FIG. 17 is a block diagram outlining of the basic configuration of the conference managing terminal 50 of the second embodiment of the present invention.
Figure 18:
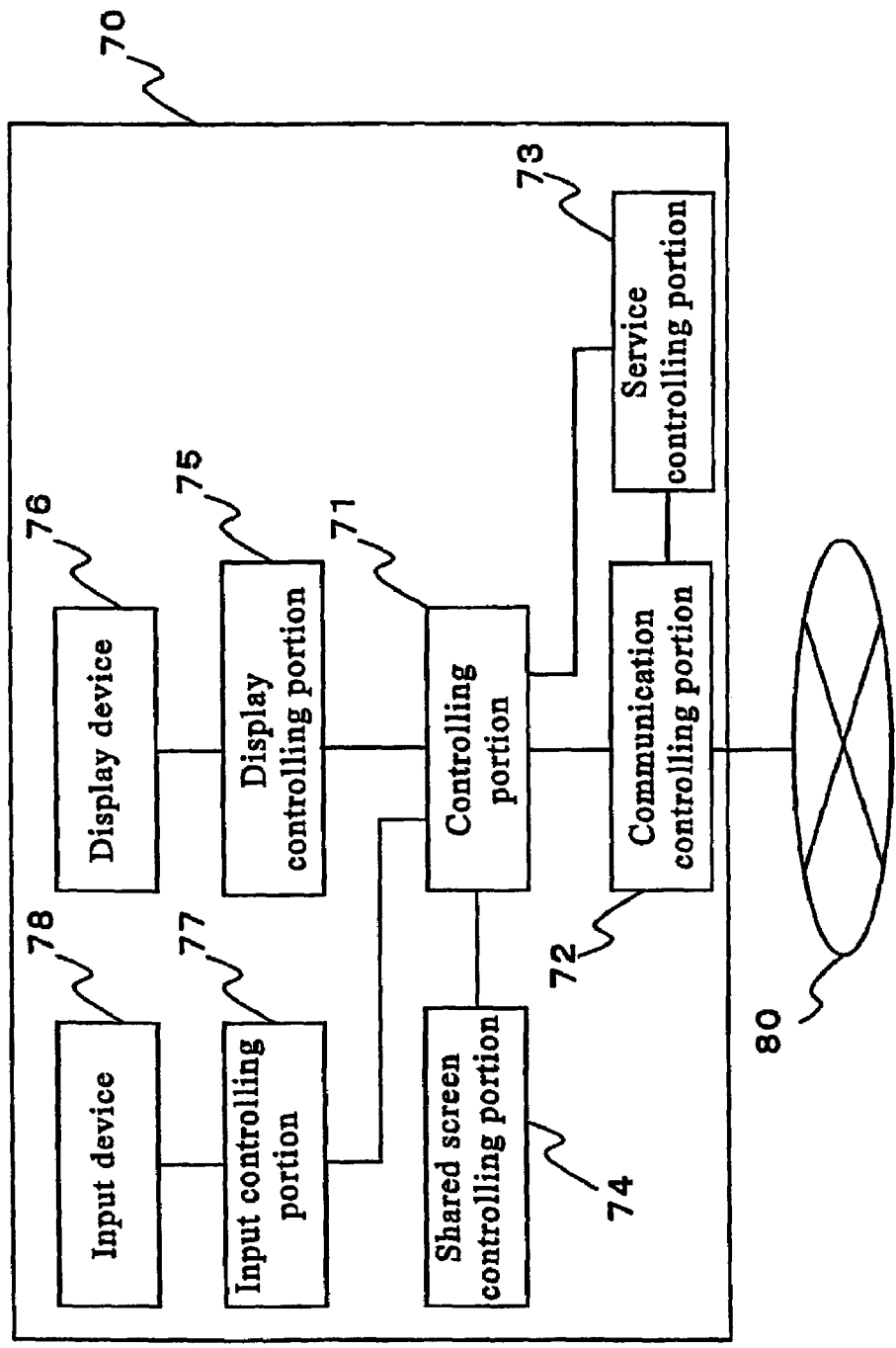
FIG. 18 is a block diagram outlining the basic configuration of a participant communication terminal 70 in accordance with the second embodiment of the present invention.

FIG. 16 shows the configuration of the entire apparatus for controlling a shared screen in accordance with a second embodiment of the present invention. In this drawing, a device for managing a conference, a device for providing a shared screen, and participant communication terminals are connected over a network. FIG. 17 is a block diagram showing the configuration of the terminal for managing a conference. FIG. 18 is a block diagram showing the configuration of the participant communication terminals. The configuration of the terminal for providing a shared screen is substantially the same as the configuration of the participant communication terminals.

In FIG. 16, numeral 50 denotes a device for managing a conference, numeral 60 denotes a terminal for providing a shared screen, numeral 70 denotes a participant communication terminal, and numeral 80 denotes a network. The device 50 for managing a conference, the terminals 60 for providing a shared screen, and the participant communication terminals 70 can be personal computers provided with the necessary peripherals and software described below, and are connected to the network 80 with communication controlling portion 52. The network 80 can be, for example, a LAN (local area network), WAN (wide area network), or the internet, and it is desirable to ensure a certain communication speed.

FIG. 16 shows a configuration with two terminals 60a and 60b for providing a shared screen, and two participant communication terminals 70a and 70b, but there is, of course, no particular limitation to the number of these terminals.

In the block diagram in FIG. 17 showing the configuration of the terminal 50 for managing a conference, numeral 51 denotes a controlling portion, numeral 52 denotes a communication controlling portion, numeral 53 denotes a service controlling portion, numeral 54 denotes a shared-screen managing portion, numeral 55 denotes a conference database managing portion, and numeral 56 denotes a conference database. In order to keep the explanations simple, memories and other structural elements have been omitted where appropriate. Furthermore, input devices and display devices have note been depicted in the drawing, but the terminal 50 for managing a conference can of course be provided with an input devices or a display device, if necessary.

The controlling portion 51 controls the processing of the entire terminal 50 for managing a conference.

The communication controlling portion 52 provides a communication interface and sends and receives data to and from other participant communication terminals via the network 80.

The service controlling portion 53 controls the service provided with regard to the "entire screen sharing method". It selects and controls services based on information regarding the conference from the conference database managing portion 55, or the request for a conference by a participant communication terminal 70 received via the communication controlling portion 52.

The shared-screen managing portion 54 manages and controls the shared screen that can be provided to the participant communication terminal 70, and of the shared screens for an electronic conference that can be provided to the conference, the most appropriate screen is dynamically provided.

The conference database 56 stores information about the conference that is currently being held, the participant communication terminals, and the terminals for providing a screen. The-conference database controlling portion 55 manages the conference database 56.

In the block diagram in FIG. 18, which shows the configuration of the participant communication terminals, numeral 71 denotes a controlling portion, numeral 72 denotes a communication controlling portion, numeral 73 denotes a service controlling portion, numeral 74 denotes a shared-screen controlling portion, numeral 75 denotes a display controlling portion, numeral 76 denotes a display device, numeral 77 denotes an input controlling device, and numeral 78 denotes an input device. In order to keep the explanations simple, memories and other structural elements have been omitted where appropriate. The basic configuration of the terminals for providing a shared screen is the same, so a further explanation has been omitted.

The controlling portion 71 controls the processing of the entire participant communication terminal 70 participating in the conference.

The communication controlling portion 72 provides a communication interface and sends and receives data to and from the conference managing terminal 50, the terminal 60 for providing a screen, and other participant communication terminals 70 via the network 80.

The service controlling portion 73 controls the service provided with regard to the "entire screen sharing method", and provides the acquired shared screen.

The shared-screen controlling portion 74 controls the display of the shared screen obtained via the service controlling portion 73.

The display controlling portion 75 and the display device 76 can display the shared screen provided by the participants in the electronic conference, such as a CRT (cathode ray tube) or a liquid crystal display device.

The input controlling portion 77 and the input device 78 receive command inputs from the participants in the electronic conference, and can be any type of inputting device, for example a keyboard, a mouse, an external storage device, an image capturing device such as a camera, which is necessary for electronic conferences, or a voice input device, such as a microphone.

Figure 19:
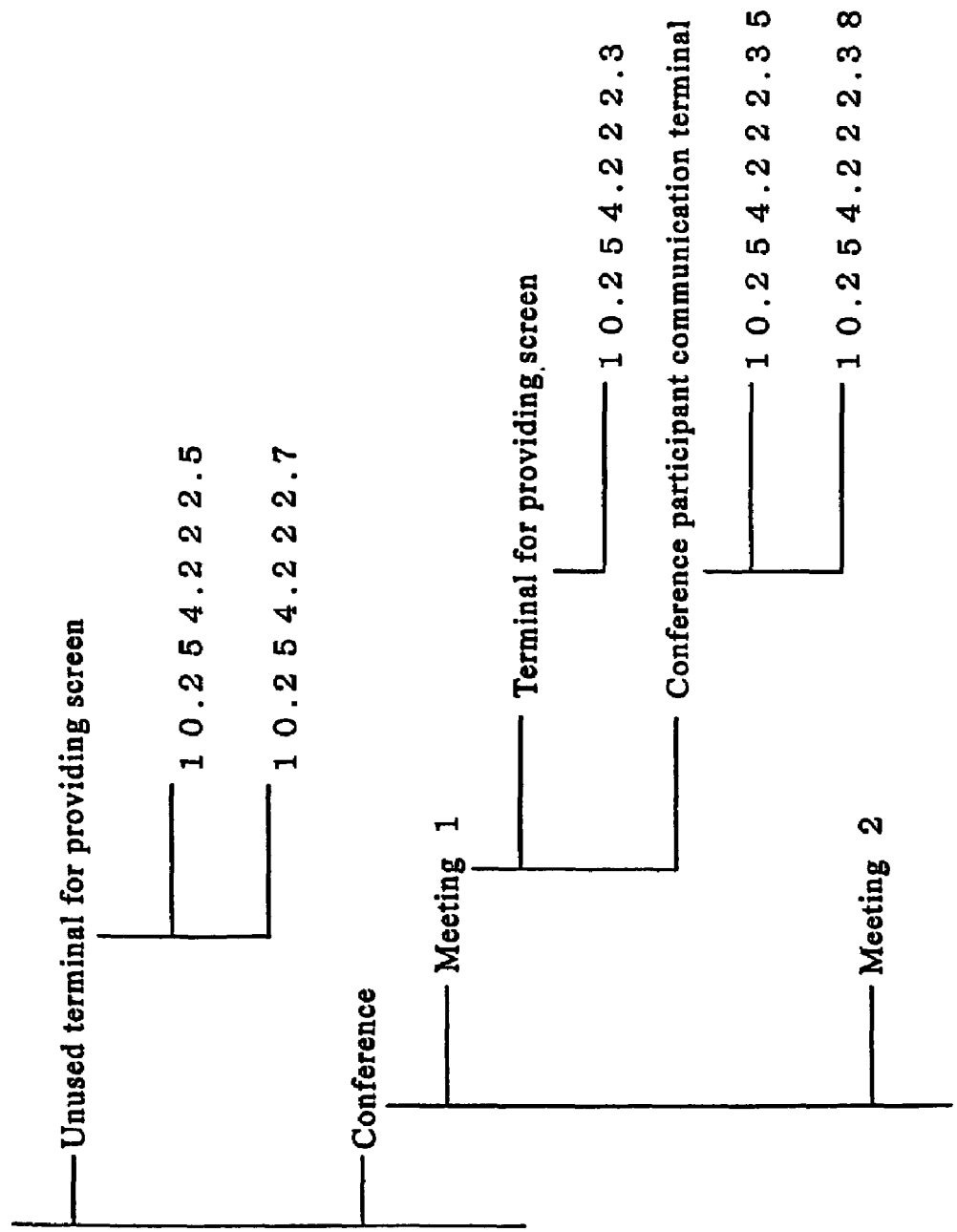
FIG. 19 is a drawing illustrating the information managed by the conference database 56 of the conference managing terminal 50 in the second embodiment of the present invention.

FIG. 19 illustrates the information managed by the conference database of the conference managing terminal 50. The information managed in the example shown in FIG. 19 includes information about terminals that are not yet used for providing a screen, and information managed for each electronic conference. With the information about terminals that are not yet used for providing a screen, the shared screens that can be assigned to a newly opened electronic conference can managed. Moreover, with the information managed for each electronic conference, the time, place and participant communication terminals for an opened electronic conference etc. can be managed, and it becomes possible to dynamically and optimally provide a shared screen selected from unused shared screen for an opened conference. In other words, it is not necessary to prepare a fixedly designated terminal for providing a shared screen for each electronic conference, and the resources from the entire network can be distributed optimally.

Figure 20:
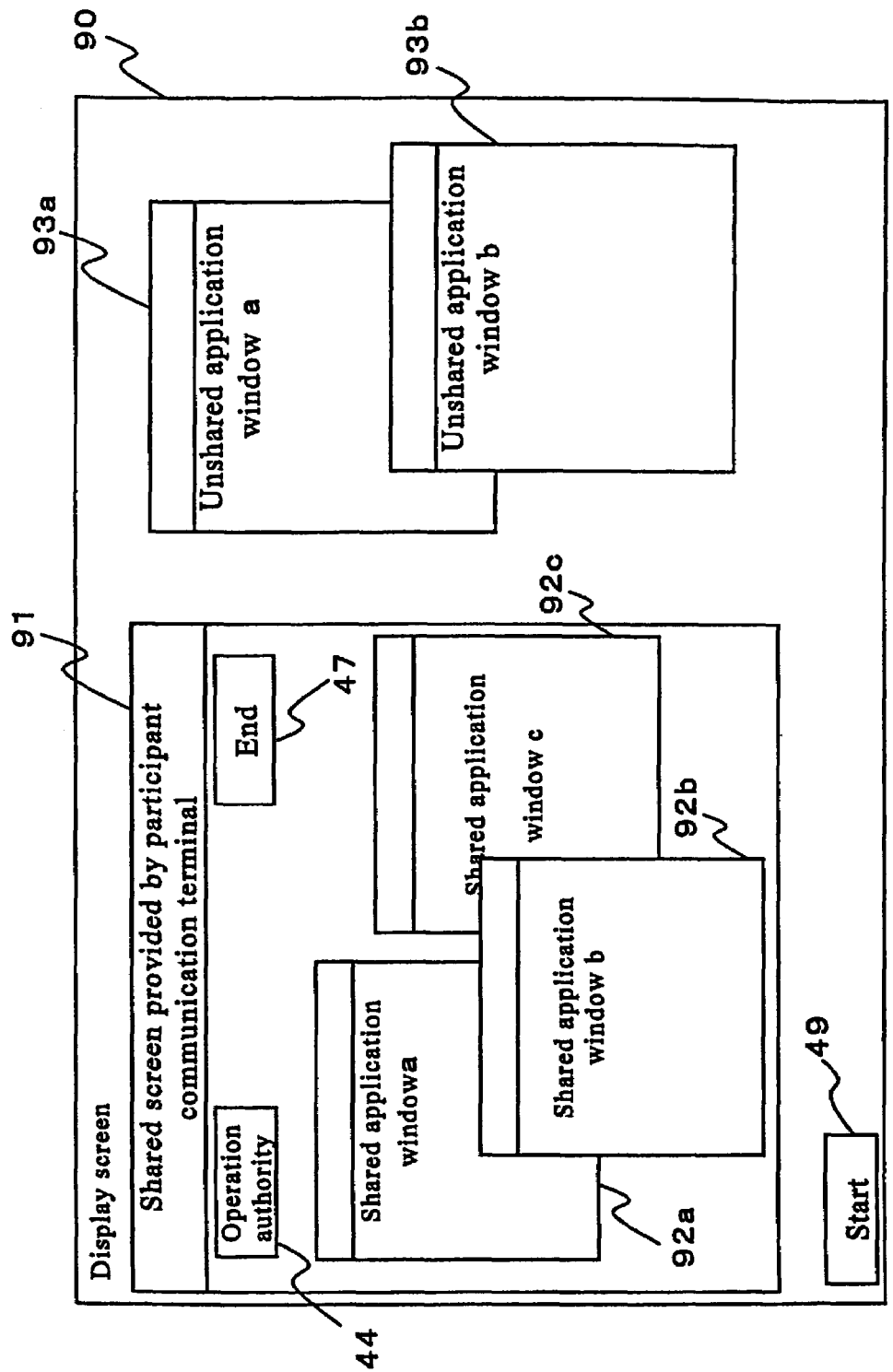
FIG. 20 is an example of the display screen as displayed on the display device 75 of the participant communication terminals 70 in the second embodiment of the present invention.

FIG. 20 illustrates an example of a display screen on the display devices 76 of the participant communication terminals 70. As is shown in FIG. 20, the windows displayed on the display screen 90 can be broadly classified into: a shared window 91, shared application windows 92 that are shared on the shared window 91, and unshared applications 93 that are local windows in the same participant communication terminal.

The shared window 91 displays the entire screen provided from the terminal for providing a shared screen. Inside the shared window 91, the windows 92 of the shared applications are displayed as sub-windows. Moreover, the shared window 91 includes icons and buttons for various operation inputs by the user relating to the shared application, like in the first embodiment. In the example in FIG. 20, it includes an operation authority button 44, and an end button 47. The functions for these buttons are the same as in the first embodiment, so that their further explanation has been omitted.

The unshared application windows 93 are local windows of applications running on the same terminal and are not displayed on the display screens of the other communication terminals 10.

Figure 21:
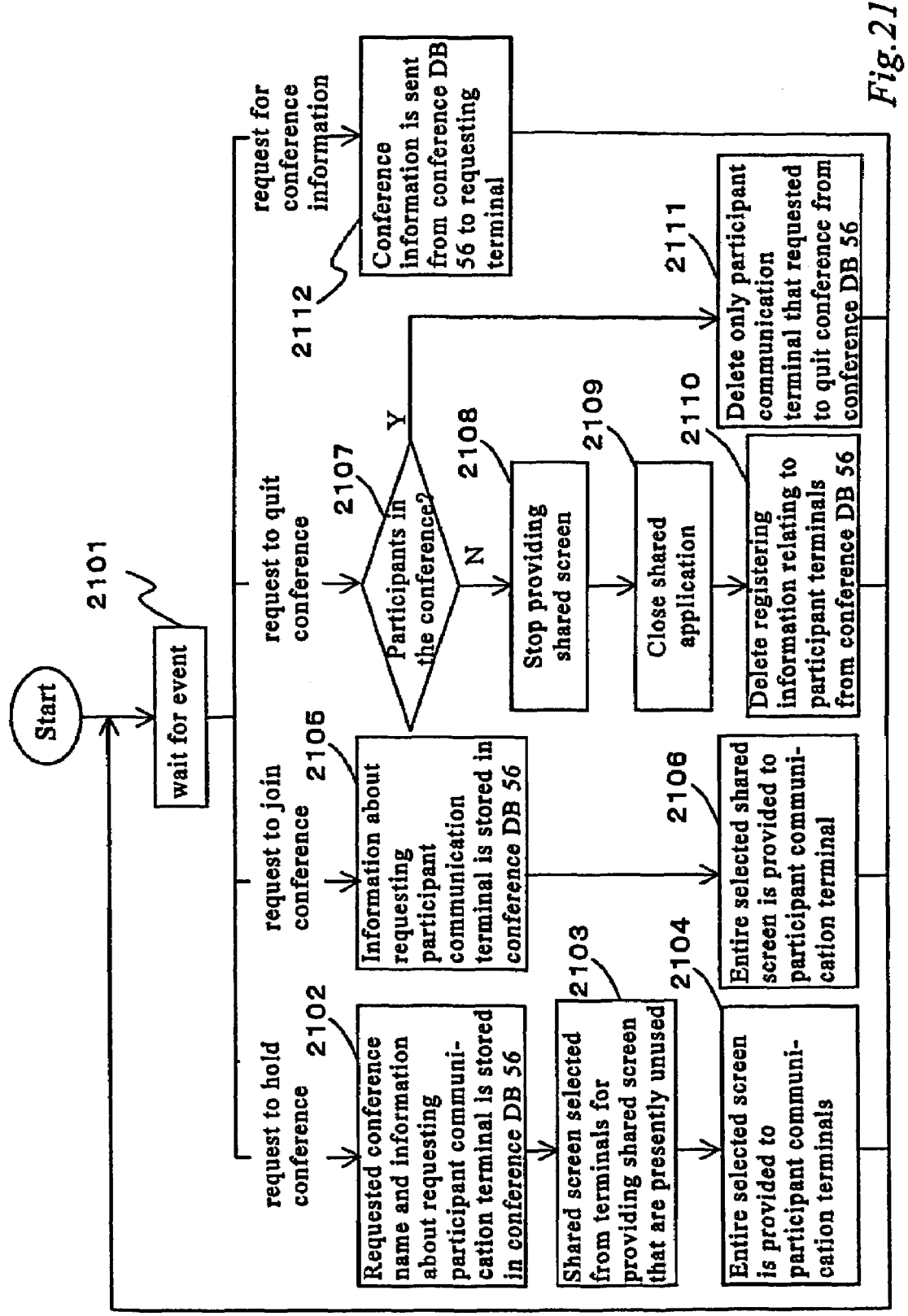
FIG. 21 is a flowchart outlining the entire process flow for the conference managing terminal 50 in the second embodiment of the present invention.
Figure 22:
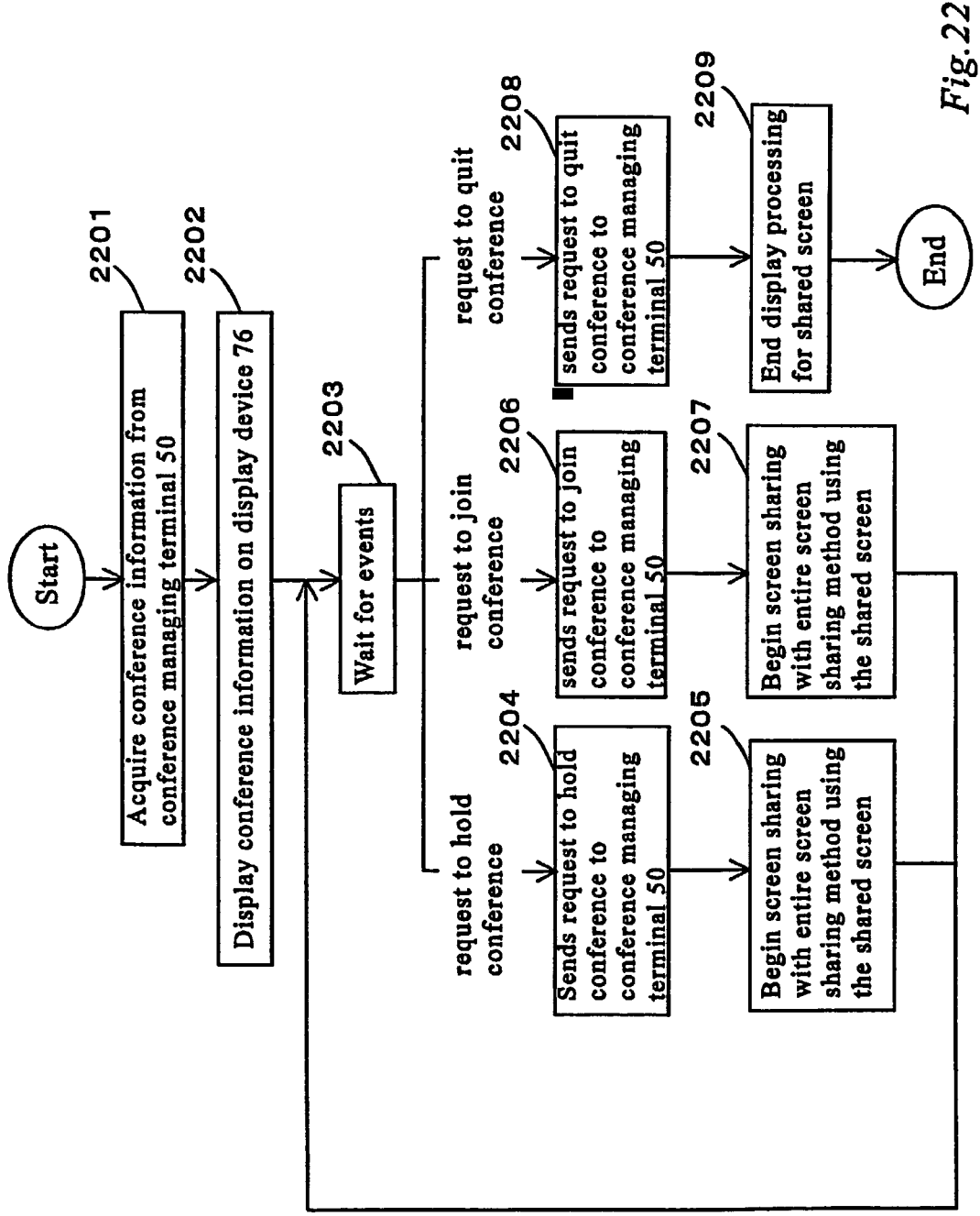
FIG. 22 is a flowchart outlining the entire process flow for the participant communication terminal 70 in the second embodiment of the present invention.

The following is an explanation of an example of the process flow in an apparatus for controlling a shared screen in accordance with the second embodiment, with reference to the flowcharts shown in FIGS. 21 and 22. The flowchart in FIG. 21 outlines the entire process flow for the conference managing terminal 50, and the flowchart in FIG. 22 outlines the entire process flow for a participant communication terminal 70. The processing for input operations to the shared window and the processing for an input operation to the shared applications from the participant communication terminals during the conference is the same as for a regular "entire screen sharing" system, so that further explanations have been omitted.

The flowchart in FIG. 21 outlines the entire process flow of the conference managing terminal 50. FIG. 21 shows the process flow of the conference managing terminal 50 with regard to the following four requests received over the network.

First, the process flow when a request to hold a conference has been received is explained. If the service controlling portion 53 of the conference managing terminal 50 receives a request to hold a conference while it is waiting for events (step S2101), the name of the requested conference and information about the participant communication terminal is stored in the conference database 56 via the conference database managing portion 55 (step S2102). The service controlling portion 53 selects the shared screen from the terminals for providing a shared screen that are presently unused, or it selects the screen that it holds and manages itself (step S2103). The service controlling portion 53 provides the entire selected screen to the participant communication terminals (step S2104), and returns to the state of waiting for events (step S2101).

The following illustrates the process flow when a request to participate in a conference has been received from a participant communication terminal. If the service controlling portion 53 of the conference managing terminal 50 receives a request to participate in a conference while it is waiting for events (step S2101), the name of the requested conference and information about the participant communication terminal is stored in the conference database 56 via the conference database managing portion 55 (step S2105). The service controlling portion 53 provides the entire selected screen to the requesting participant communication terminal (step S2106), and returns to the state of waiting for events (step S2101).

The following illustrates the process flow when a request to quit a conference has been received from a participant communication terminal. If the service controlling portion 53 of the conference managing terminal 50 receives a request to quit a conference while it is waiting for events (step S2101), it searches the conference database 56 via the conference database managing portion 55 and checks whether there are other terminals participating in the conference besides the participant communication terminal requesting to quit the conference (step S2107). If there are no other participants in the conference (step S2107: N) it ceases to provide a shared screen, because a shared screen is not necessary anymore (S2108). Moreover, if there are shared applications that are used in the application and still running, these shared applications are closed (step S2109). When the termination processing of steps S2108 and S2109 is finished, the information relating to the electronic conference and the participant terminals is deleted from the conference database 56 via the conference database managing portion 55 (step S2110), and the service controlling portion 53 returns to the state of waiting for events (step S2101). Here, the shared screen of the terminal that has provided the shared screen returns to being unused, so that this information is added and updated to the conference database 56.

If there are other conference participants 70 in step S2107 (step S2107: Y), the information relating to the participant communication terminal that requested to quit the conference is deleted from the conference database 56 (step S2111), and the system returns to the state of waiting for events (step S2101).

The following illustrates the process flow when there is a request to send information relating to the conference from a participant communication terminal. If the service controlling portion 53 of the conference managing terminal 50 receives a request to send information relating to the conference while it is waiting for events (step S2101), the corresponding conference information is sent by the conference database 56 via the conference database controlling portion 55 (step S2112), and the system returns to the state of waiting for events (step S2101).

The above is the process flow in response that the conference managing terminal 50 receives over the network.

The following is an explanation of the flowchart in FIG. 22 showing an outline of the entire process flow of a participant communication terminal 70. In its center, FIG. 22 shows the process flow of the participant communication terminal 70 with regard to the three requests that the user inputs via the input device 78.

It is assumed that the participant communication terminal 70 acquires conference information from the conference managing terminal 50 (step S2201), displays the conference information on the display device 76 (step S2202), and then waits for events to be entered by the user (step S2203).

If the user has entered a request to hold a conference via the input device 78, the service controlling portion 73 sends this request for a conference to the conference managing terminal 50 (step S2204). When the shared screen information is provided by the processing on the conference managing terminal 50 as shown in FIG. 22, the screen sharing with the entire screen sharing method using this shared screen begins (step S2205).

If the user has entered a request to participate in a conference via the input device 78, the service controlling portion 73 sends this request to participate in a conference to the conference managing terminal 50 (step S2206). As above, when the shared screen information is provided by the processing of the conference managing terminal 50, the screen sharing with the entire screen sharing method using this shared screen begins (step S2207).

If the user has entered a request to quit a conference via the input device 78, the service controlling portion 73 sends this request to quit a conference to the conference managing terminal 50 (step S2208), and the display processing for the shared screen is terminated (step S2209).

The above is an outline of the process flow with regard to responses of the participant communication terminal 70 to requests entered by the user.

With the apparatus for controlling a shared screen according to the second embodiment of the present invention, an electronic conference system of the entire screen sharing type can be realized. One terminal for providing a shared screen can be selected appropriately and dynamically, and the resources on the network can be distributed optimally. Because it is the entire screen sharing type shared windows and local windows of the communication terminal itself can be displayed, and it can be easily determined whether a window on the display device is a window of a shared application or a window of an unshared application.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An apparatus for controlling a shared screen for a plurality of shared applications, which can be shared in a network system of a plurality of connected communication terminals, with other communication terminals while running on different terminals among the terminals, the apparatus comprising:

communication terminals comprising a window information acquiring unit acquiring window information of each of the applications to be shared while running on the different terminals, a shared window information managing unit managing the acquired window information of the applications to be shared and a window controlling unit controlling how windows are displayed on said communication terminals, wherein the shared window information managing unit manages a display layering order for displaying shared applications while running on the different terminals among the terminals, and said window controlling unit displays a window of shared space for displaying windows of shared applications collectively as sub-windows based on the display layering order, and detects an operation input to a window in the window of shared space and if the window is not an uppermost window in the window of shared space, updates the display layering order so that the window is displayed as an uppermost window in the window of shared space, and notifies other communication terminals of the updated display layering order to change the display layering order at the other communication terminals.

2. The apparatus according to claim 1, wherein, after said window controlling unit changes the way said window of shared space is displayed in accordance with an operation on one of the communication terminals, the window controlling unit changes the way said window of shared space is displayed on other communication terminals.

3. The apparatus according to claim 1, further comprising a starting sharing unit with which said communication terminals put an application into sharing, wherein:

if sharing of one application displayed on said local window has been started by said starting sharing unit, said window controlling unit removes a window of said one application from said local window, and displays it on said window of shared space.

4. The apparatus according to claim 2, further comprising a starting sharing unit with which said communication terminals put an application into sharing, wherein:

if sharing of one application displayed on said local window has been started by said starting sharing unit, said window controlling unit removes a window of said one application from said local window and displays it on said window of shared space.

5. The apparatus according to claim 1, wherein:

each said communication terminal comprises a starting unit starting a shared application, said starting unit comprising an application selection unit selecting an application that can be executed by said communication terminals, and a second starting unit starting said selected application on the same terminal; and when sharing of said selected application is started, information necessary for sharing of the application is provided to other communication terminals.

6. The apparatus according to claim 5, wherein an input unit of each said starting unit is included within said window of shared space.

7. The apparatus according to claim 1, further comprising:

an operation authority managing unit managing an operation authority, having authority for operating a shared application running in said window of shared space and its sub-window; and an operation authority acquiring unit acquiring said operation authority, wherein only a communication terminal that has acquired said operation authority can operate said window of shared space and all shared applications.

8. A computer-readable recording medium storing a program for realizing an apparatus for controlling a shared screen of a shared application that can be shared, in a network system of a plurality of connected communication terminals, with other communication terminals while running on the terminals, comprising:

a window information acquisition operation, wherein said communication terminals acquire window information for each said shared application, while running on the terminals, a shared window information managing operation managing the acquired window information of the acquired shared applications, and a window controlling operation controlling how windows on said communication terminal are displayed, and wherein said shared window information managing operation manages a display layering order for displaying each shared application while running on each terminal, and said window controlling operation displays a window of shared space for displaying windows of shared applications collectively as sub-windows based on the display layering order, and detects an operation input to a window in the window of shared space and, if the window is not an uppermost window in the window of shared space, updates the display layering order so that the window is displayed as an uppermost window in the window of shared space, and notifies other communication terminals of the updated display layering order to change the display layering order at the other communication terminals.

9. A method of sharing a sharing-window over a network amongst a plurality of clients connected to the network, where the sharing-window contains applications executing on and shared from each of the clients, the method comprising:

displaying, at each of the clients, the sharing-window with a display arrangement of the applications therein, where each client displays the sharing-window as an individual window displayed and managed by a windowing management system of such client, and where each windowing management system is capable of displaying other non-shared applications outside the sharing-window that it is managing; and allowing each of the clients to direct interactive input to the sharing-window to interactively change the display arrangement of applications in the sharing-window, and when one of the clients is interactively operated to initiate a change to the display arrangement of applications in the one client's sharing-window, automatically causing the sharing-window at each of the clients to be displayed in accordance with the change to the display arrangement of applications in the one client's sharing-window, wherein the change comprises changing a display layering order of the applications in the respective sharing-windows of the clients.

10. A method according to claim 9, wherein the one of the clients directs an interactive input to one of the applications displayed in its sharing-window, further comprising:
  determining if the one client has permission to operate the one of the applications to which the interactive change is directed, and, if so determined, passing the interactive input to the one of the applications which then processes the interactive input.

\* \* \* \* \*